United States Patent
Kirchner

(10) Patent No.: US 11,321,591 B2
(45) Date of Patent: May 3, 2022

(54) SYSTEM FOR IDENTIFYING A DEFINED OBJECT

(71) Applicant: Presien Pty Ltd, Eveleigh (AU)

(72) Inventor: Nathan Graham Edward Kirchner, Chippendale (AU)

(73) Assignee: PRESIEN PTY LTD, Eveleigh (AU)

(*) Notice: Subject to any disclaimer, the term of this patent is extended or adjusted under 35 U.S.C. 154(b) by 45 days.

(21) Appl. No.: 16/484,736

(22) PCT Filed: Feb. 8, 2018

(86) PCT No.: PCT/AU2018/050095
§ 371 (c)(1),
(2) Date: Aug. 8, 2019

(87) PCT Pub. No.: WO2018/145158
PCT Pub. Date: Aug. 16, 2018

(65) Prior Publication Data
US 2020/0050901 A1    Feb. 13, 2020

(30) Foreign Application Priority Data
Feb. 9, 2017    (AU) .................... 2017900403

(51) Int. Cl.
*G06K 9/62*     (2022.01)
*G06K 9/00*     (2022.01)
(Continued)

(52) U.S. Cl.
CPC ....... *G06K 9/6288* (2013.01); *G06K 9/00335* (2013.01); *G06K 9/00624* (2013.01);
(Continued)

(58) Field of Classification Search
None
See application file for complete search history.

(56) References Cited

U.S. PATENT DOCUMENTS 9,177,225 B1    11/2015    Cordova-Diba et al.
10,318,827 B2 *  6/2019    Jia .................... G06N 3/0454
(Continued)

FOREIGN PATENT DOCUMENTS

WO    WO 2016/115499    7/2016

OTHER PUBLICATIONS

Toa et al (NPL titled: Robust face detection using local CNN and SVM based on kernel combination) Neurocomputing211(2016)98-105 (Year: 2016).*

(Continued)

*Primary Examiner* — Andrae S Allison

(57) ABSTRACT

System/method identifying a defined object (e.g., hazard): a sensor detecting and defining a digital representation of an object; a processor (connected to the sensor) which executes two techniques to identify a signature of the defined object; a memory (connected to the processor) storing reference data relating to two signatures derived, respectively, by the two techniques; responsive to the processor receiving the digital representation from the sensor, the processor executes the two techniques, each technique assessing the digital representation to identify any signature candidate defined by the object, derive feature data from each identified signature candidate, compare the feature data to the reference data, and derive a likelihood value of the signature candidate corresponding with the respective signature; combining likelihood values to derive a composite likelihood value and thus determine whether the object in the digital representation is the defined object.

20 Claims, 15 Drawing Sheets

(51) Int. Cl.
*G06K 9/46* (2006.01)
*G08B 6/00* (2006.01)
*G08B 21/02* (2006.01)

(52) U.S. Cl.
CPC ............. *G06K 9/46* (2013.01); *G06K 9/6202* (2013.01); *G06K 9/6255* (2013.01); *G06K 9/6256* (2013.01); *G08B 6/00* (2013.01); *G08B 21/02* (2013.01)

(56) References Cited

U.S. PATENT DOCUMENTS

| | | | | |
|---|---|---|---|---|
| 10,872,379 | B1* | 12/2020 | Nepomuceno | G01C 21/3697 |
| 2014/0270494 | A1* | 9/2014 | Sawhney | G06K 9/6253 |
| | | | | 382/159 |
| 2017/0053169 | A1* | 2/2017 | Cuban | H04N 7/185 |
| 2017/0228633 | A1* | 8/2017 | Danihelka | G06N 3/0472 |
| 2018/0005139 | A1* | 1/2018 | Dhanyamraju | G06F 30/20 |
| 2018/0136000 | A1* | 5/2018 | Rasmusson, Jr. | G05D 1/0274 |
| 2018/0143628 | A1* | 5/2018 | Samper | B60W 50/12 |
| 2018/0173971 | A1* | 6/2018 | Jia | G06K 9/6288 |
| 2018/0215395 | A1* | 8/2018 | Keany | G06K 9/00221 |
| 2018/0348759 | A1* | 12/2018 | Freeman | G01C 21/3415 |

OTHER PUBLICATIONS

Zhao et al (NPL titled: Grouping Attribute Recognition for Pedestrian with Joint Recurrent Learning) Proceedings of the Twenty-Seventh International Joint Conference on Artificial Intelligence (IJCAI-18) (Year: 2018).*

Medina et al, Compact laser radar and three-dimensional camera, J. Opt. Soc. Am. A/vol. 23, No. 4/Apr. 2006 (Year: 2006).*

Australian Patent Office, International Search Report and Written Opinion of the International Searching Authority, PCT/AU2018/050095, dated Mar. 22, 2018, 17 pages.

Lutz, M. et al., "Probabilistic object recognition and pose estimation by fusing multiple algorithms", 2013 IEEE International Conference on Robotics and Automation (ICRA), Oct. 17, 2013, pp. 4244-4249.

Lutz, M. et al., "Probabilistic fusion of multiple algorithms for object recognition at information level", 2012 IEEE International Conference on Technologies for Practical Robot Applications (TePRA), Jun. 14, 2012, pp. 139-144.

* cited by examiner

SYSTEM FOR IDENTIFYING A DEFINED OBJECT

CROSS-REFERENCE TO RELATED APPLICATIONS

The present application claims priority from Australian Provisional Patent Application No 2017900403, filed on 9 Feb. 2017, the content of which is incorporated herein by reference.

TECHNICAL FIELD

The present disclosure relates generally to systems and methods for identifying a predefined object. In particular, the disclosure relates to systems and methods involving detecting an object with a sensor and confirming if the detected object is the defined object.

BACKGROUND

In many scenarios, it is useful to rapidly identify a defined object to prompt an action to be taken. For example, on construction sites, workers and high-value equipment are often at risk of being damaged during use, which can cause injury, death and/or incur significant costs. To mitigate this risk, a person may be employed as a 'spotter' to manually identify high risk situations and activate an alarm to prevent damage and/or injury. Similarly, storage locations for high value assets are typically accessible only by an authorised person, therefore requiring a security application and/or device to confirm whether a person attempting to access the location is authorised to do so. This may be achieved by biometric authentication, for example, confirming if the person has a finger print corresponding with a previously stored image of the finger print of the authorised person.

Automated systems for identifying an object are known and employed for a range of different purposes. One example of such a system is described in U.S. Pat. No. 8,588,527 which involves identifying an object shown in an image captured by a camera-equipped smart phone and deriving search terms relating to the object, thereby allowing a search query to be generated and executed using the search terms to identify information relevant to the identified object. Whilst this system appears to be an effective tool for identifying an object, in practice, such systems often fail or inaccurately identify the object as the operating conditions necessary for the system to operate effectively are typically very restrictive. For example, the orientation and/or position of the camera relative to the object, and/or lighting or other environmental conditions proximal to the object, can significantly affect the accuracy of the system.

Furthermore, relevant prior art approaches often require complex and expensive equipment, such as multiple sensors and computer processors, to achieve accurate results.

Any discussion of documents, acts, materials, devices, articles or the like included in the present specification is not to be taken as an admission that any or all of these matters form part of the common general knowledge in the field relevant to the present disclosure as it existed before the priority date of each claim of this application.

SUMMARY

According to some disclosed embodiments, there is provided a system for identifying a defined object. The system includes at least one sensor configured to detect data to define a digital representation of an object, a processor communicatively connected to the at least one sensor, the processor configured to execute at least two techniques, each technique configured to identify a signature defined by the defined object, and a memory communicatively connected to the processor, the memory storing reference data relating to at least two signatures derived, respectively, by the at least two techniques. The processor is configured so that responsive to the processor receiving data from the at least one sensor defining the digital representation, the processor executes the at least two techniques, causing each technique to assess the digital representation to identify any signature candidate defined by the object, derive feature data from each identified signature candidate, compare the feature data to the reference data, and derive a likelihood value from each comparison, each likelihood value indicating a likelihood of the signature candidate corresponding with the respective signature. The processor then combines at least some of the likelihood values to derive a composite likelihood value and determines, from the composite likelihood value, whether the object in the digital representation is the defined object.

The processor may be further configured so that responsive to determining the object in the digital representation is the defined object, the processor adds the feature data which the at least some of the likelihood values were derived from to the reference data.

The system may include a user interface, and, responsive to determining the object in the digital representation is the defined object, the processor may be configured to operate the user interface to obtain user input to confirm the object is the defined object, and, responsive to the user input, the processor adds the feature data which the at least some of the likelihood values were derived from to the reference data. This may also involve the processor being configured to operate the user interface to obtain user input to confirm one or more indicators which indicate the object in the digital representation is the defined object, and wherein responsive to the user input, the processor derives indicator data from the one or more confirmed indicators and adds the indicator data to the reference data. The one or more indicators may comprise context factors associated with the object in the digital representation.

Where the system includes a user interface, responsive to determining the object in the digital representation is the defined object, the processor may be configured to operate the user interface to obtain user input to define one or more actions to be executed by the system, and, responsive to the user input, the processor: derives instructions from the one or more defined actions; executes the instructions; and stores the instructions in the memory for execution responsive to subsequently determining the object in the digital representation is the defined object.

The system may include an alert device configured to emit a discernible alarm, and wherein the processor is further configured so that responsive to determining the object in the digital representation is the defined object, the processor operates the alert device. The alert device may be configured as one or more of: a wearable device to be worn by a user; a haptic component of an apparatus; and a controller for controlling operation of an apparatus, and operating the alert device effects control of the apparatus.

The system may include a plurality of the sensors and each of the plurality of sensor is communicatively connected to the other sensors and to the processor. This may involve each sensor having a controller for controlling operation of the sensor, and communication between the plurality of sensors cause operation of at least one of the controllers to effect control of the respective sensor. Also, the digital representation may comprise data detected by more than one of the plurality of sensors.

Each of the signatures may comprise specific feature data.

Each of the techniques may derive a different signature from the defined object.

At least one of the signatures may be defined by at least one of: a property of the defined object; geometry of the defined object; behaviour of the defined object; and one or more context factors associated with the defined object. The behaviour of the defined object may comprise one or more of: movement of the defined object; inactivity of the defined object; relative movement of the defined object and another object; and a response of the defined object responsive to a stimuli.

The one or more context factors associated with the defined object may include: time of day local to the defined object; environmental conditions local to the defined object; weather local to the defined object; a position of one or more objects relative to the defined object; behaviour of one or more objects local to the defined object; and operating parameters of the defined object.

At least one identified signature candidate may be defined by at least one of: a property of the object; geometry of the object; behaviour of the object; and one or more context factors associated with the object.

The at least two techniques may be configured to be complementary. This may involve the at least two techniques being selected for execution by the processor from a range of different techniques.

For each of the techniques, the processor may be trained to derive feature data from exposure to predetermined training data, and to store the feature data derived from the predetermined training data as the reference data.

The predetermined training data may include a plurality of digital representations, wherein only some of the plurality of digital representations include the defined object and are labelled to confirm presence of the defined object, and wherein the processor is configured to only store feature data derived from the labelled digital representations as the reference data. The predetermined training data may be manually configured by a user labelling each digital representation including the defined object.

For each of the techniques, exposure to the predetermined training data may cause the processor to learn one or more common elements defined in each labelled digital representation, and to derive the signature responsive to the one or more common elements.

The reference data may define a feature data variance distribution, and the likelihood value may be derived from comparing the feature data to the feature variance distribution.

Each technique may be associated with a respective feature data variance distribution. Each technique may define the respective feature variance distribution as a probability distribution function, and the likelihood value is derived from comparing the feature data to the probability distribution function.

The feature variance distribution may define as a Gaussian curve, and the likelihood value is derived from determining a position of the feature data relative to the Gaussian curve. Alternatively or additionally, the feature variance distribution may define a cloud formed from a plurality of Gaussian curves, and the likelihood value is derived from determining a proximity of the feature data relative to a maximum density region of the density cloud.

The processor may be configured to execute at least one secondary technique, and, responsive to the processor deriving a likelihood value from each of the at least two techniques, the processor may execute the secondary technique, causing the secondary technique to compare at least one likelihood value derived by at least some of the techniques to derive a further likelihood value, and wherein the further likelihood value is combined with at least one other likelihood value to derive the composite value. Comparison of the likelihood values may comprise determining a correlation between the compared likelihood values. The memory may store comparison reference data relating to predetermined compared likelihood values, and comparison of the likelihood values may comprise comparing the likelihood values to the comparison reference data to derive the further likelihood value.

Deriving the composite likelihood value may comprise combining at least one of the likelihood values derived by executing one of the techniques with at least one of the likelihood values derived by executing another of the techniques.

The memory may store composite reference data relating to predetermined composite likelihood values, and determining whether the object in the digital representation is the defined object may comprise comparing the composite likelihood value to the composite reference data to derive a confidence value, and determining whether the object in the digital representation is the defined object is based on the confidence value.

The composite reference data may be defined as a probability distribution function, and the confidence value is derived from comparing the composite likelihood value to the probability distribution function. The probability distribution function may define a Gaussian curve, and the confidence value is derived from determining a position of the composite likelihood value relative to the Gaussian curve.

Combining the likelihood values may comprise sequentially multiplying at least one likelihood value derived by each technique.

Each technique may include at least one of an algorithm and a classifier.

The feature data may define a feature vector.

The digital representation may include at least one image. The at least one image may be defined according to an RGB colour model. The sensor may comprise at least one camera.

According to other disclosed embodiments, there is provided a system for identifying a defined hazard. The system includes at least one sensor configured to detect data to define a digital representation of a scene, a processor communicatively connected to the at least one sensor, the processor configured to execute at least two techniques, each technique configured to identify a signature defined by the defined hazard, and a memory communicatively connected to the processor, the memory storing reference data relating to at least two signatures derived, respectively, by the at least two techniques. The processor is configured so that responsive to the processor receiving data from the at least one sensor defining the digital representation, the processor executes the at least two techniques, causing each technique to assess the digital representation to identify any signature candidate defined by the scene, derive feature data from each identified signature candidate, compare the feature data to the reference data, and derive a likelihood value from each comparison, each likelihood value indicating a likelihood of the signature candidate corresponding with the respective signature. The processor then combines at least some of the likelihood values to derive a composite likelihood value, and determines, from the composite likelihood value, whether the scene in the digital representation includes the defined hazard.

According to other disclosed embodiments, there is provided a method for identifying a defined object. The method includes detecting, with at least one sensor, data to define a digital representation of an object, providing the digital representation data to a processor and executing, by the processor, at least two techniques, causing each technique to assess the digital representation to identify any signature candidate defined by the object, derive feature data from each identified signature candidate, compare the feature data to reference data relating to a signature defined by the defined object and derived by the technique, and derive a likelihood value from each comparison, each likelihood value indicating a likelihood of the signature candidate corresponding with the signature, combining, by the processor, at least some of the likelihood values to derive a composite likelihood value, and determining, by the processor, from the composite value, if the object in the digital representation is the defined object.

The method may involve, responsive to determining the object in the digital representation is the defined object, adding, by the processor, the feature data which the at least some of the likelihood values were derived from to the reference data.

The method may involve, responsive to determining the object in the digital representation is the defined object, operating a user interface, by the processor, to obtain user input to confirm the object is the defined object, and, responsive to the user input, adding, by the processor, the feature data which the at least some of the likelihood values were derived from to the reference data. In this scenario, the method may also involve operating the user interface, by the processor, to obtain user input to confirm one or more indicators which indicate the object in the digital representation is the defined object, and, responsive to the user input, the deriving, by the processor, indicator data from the one or more confirmed indicators and adding the indicator data to the reference data. The one or more indicators may comprise context factors associated with the object in the digital representation The method may involve, responsive to determining the object in the digital representation is the defined object, operating a user interface, by the processor, to obtain user input to define one or more actions to be executed by the system, and, responsive to the user input, deriving, by the processor, instructions from the one or more defined actions, executing the instructions, and storing the instructions in the memory for execution responsive to subsequently determining the object in the digital representation is the defined object.

The method may involve, responsive to determining the object in the digital representation is the defined object, operating, by the processor, an alert device configured to emit a discernible alarm.

The method may involve training each technique by exposing the processor executing the technique to predetermined training data, and deriving feature data, by the processor, from the predetermined training data and storing the derived feature data as the reference data. The predetermined training data may include a plurality of digital representations, wherein only some of the plurality of digital representations include the defined object and are labelled to confirm presence of the defined object, and wherein only feature data derived from the labelled digital representations is stored by the processor as the reference data. Exposing the processor executing the technique to the predetermined training data may cause the processor to learn one or more common elements defined in each labelled digital representation and derive the signature responsive to the one or more common elements.

Deriving the composite likelihood value, by the processor, may involve combining at least one likelihood value derived by executing one of the techniques with at least one likelihood value derived by executing another of the techniques.

The memory may stores composite reference data relating to predetermined composite likelihood values, and determining whether the object in the digital representation is the defined object further may comprise comparing, by the processor, the composite likelihood value to the composite reference data to derive a confidence value, and determining whether the object in the digital representation is the defined object is based on the confidence value.

In the context of this specification, it will be appreciated that the term object is interchangeable with the term hazard, where appropriate, as the disclosed systems and methods can be readily adapted to identify a defined hazard or a defined object. A hazard will be appreciated to mean a risk or danger. Similarly, the digital representation may define a detected object or a detected scene, and therefore the terms object and scene are interchangeable, where appropriate.

A technique will be understood to mean a method or process which includes at least one of an algorithm, typically configured to process data, and a classifier, typically configured to make a decision with processed data based on existing reference data. Often, a technique comprises an algorithm and a classifier, and may comprise a plurality of algorithms.

A signature will be understood to mean one or more characteristics defined by, or associated with, the defined object. The signature may include one or more of geometry defined by the object, such as a dimension ratio defined by part of the object, behaviour of the object, such as movement or inaction, and contextual factors associated with the object, such as environmental conditions. In some scenarios, the signature will comprise geometric, behaviour and contextual parameters.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be appreciated embodiments may comprise steps, features and/or integers disclosed herein or indicated in the specification of this application individually or collectively, and any and all combinations of two or more of said steps or features.

BRIEF DESCRIPTION OF DRAWINGS

Embodiments will now be described by way of example only with reference to the accompany drawings in which.

DESCRIPTION OF EMBODIMENTS

Figure 1A:
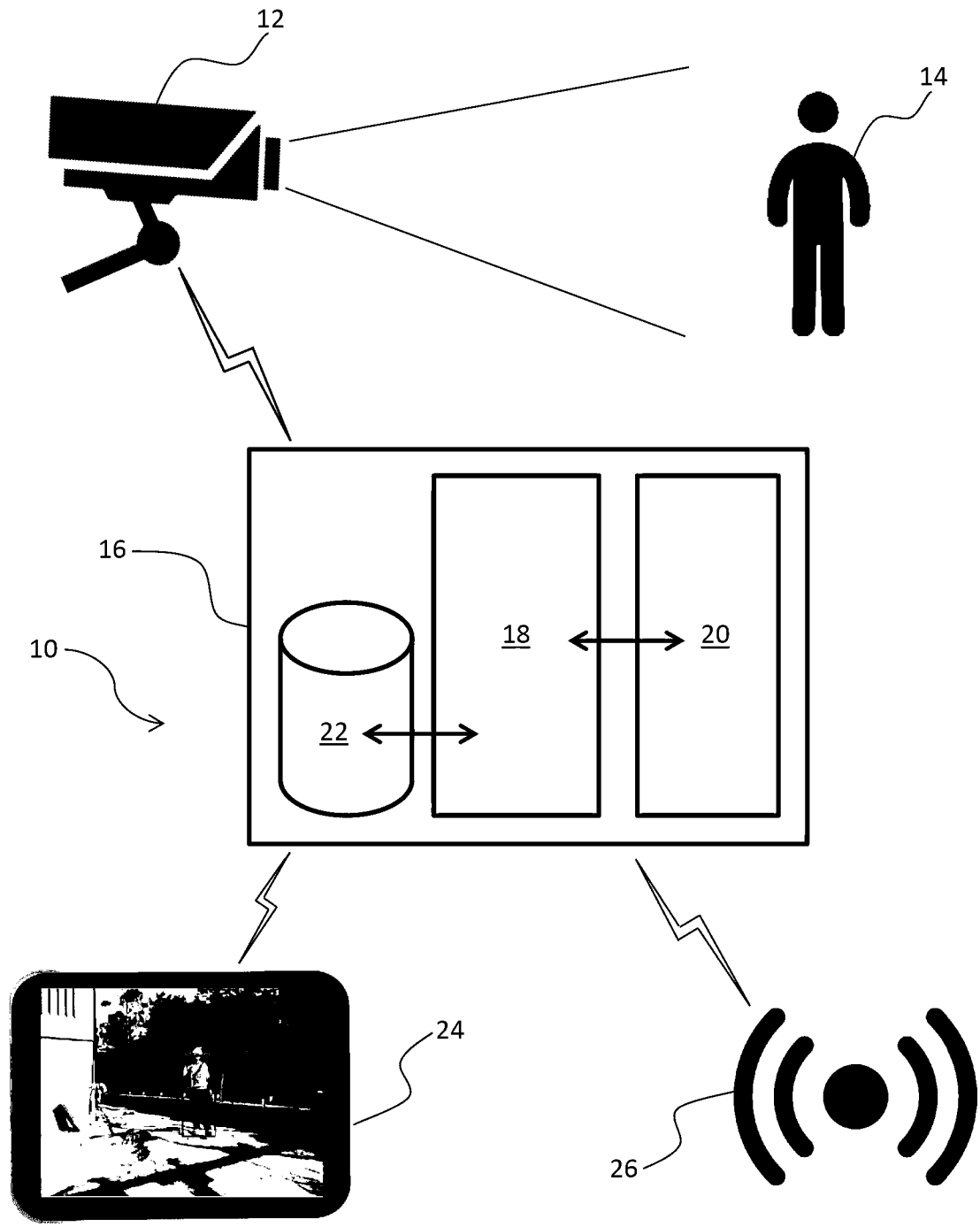
FIG. 1A is a diagram of an embodiment of a system for identifying a defined object, being a person.

In the drawings, reference numeral 10 generally designates a system 10 for identifying a defined object. The system 10 includes at least one sensor 12 configured to detect data to define a digital representation of an object 14, a processor 18 communicatively connected to the at least one sensor 12, the processor 18 configured to execute at least two techniques, each technique configured to identify a signature defined by the defined object, and a memory 22 communicatively connected to the processor 18, the memory 22 storing reference data relating to at least two signatures derived, respectively, by the at least two techniques. Responsive to the processor 18 receiving data from the at least one sensor 12 defining the digital representation, the processor 18 executes the at least two techniques, causing each technique to assess the digital representation to identify any signature candidate defined by the object 14, derive feature data from each identified signature candidate, compare the feature data to the reference data, and derive a likelihood value from each comparison, each likelihood value indicating a likelihood of the signature candidate corresponding with the respective signature. The processor 18 then combines at least some of the likelihood values to derive a composite likelihood value and determines, from the composite likelihood value, whether the object 14 in the digital representation is the defined object.

FIG. 1A shows an embodiment of the system 10. In the embodiment shown, the defined object is a person. The system 10 includes at least one sensor, configured, in this embodiment, as the camera 12, for detecting data to define a digital representation of a detected object, in this embodiment being a person 14. The camera 12 is communicatively coupled, typically wirelessly, to a server 16 including the processor 18, a program memory 20 and a data store, such as a database memory 22. The processor 18, program memory 20 and database memory 22 are communicatively connected to each other. The server 16 is also communicatively coupled, typically wirelessly, to a user interface 24 and an alert device 26, the alert device 26 configured to provide a discernible alarm.

The sensor is illustrated in FIG. 1A as the camera 12 configured to define the digital representation as an image (or collection of sequential images forming video footage) according to a red-green-blue (RGB) colour model, and, in some embodiments, also defining depth. However it will be appreciated that the sensor 12 may be configured to include one or more other forms capable of detecting data to define the digital representation, for example, a proximity sensor, a sonar system, an array of pressure pads, an array of ultrasonic transducers, LIDAR, or the like. In this way, the sensor 12 is not limited to detecting one format of data thereby allowing the digital representation of the object 14 to comprise multiple different data formats. For example, the camera 12 may be associated with proximity and motion sensors meaning that the digital representation is formed from data relating to a geometry of the object 14, data relating to movement (including direction of movement) of the object 14, and data relating to proximity of the object 14 relative to one or more reference points. It will therefore be appreciated that the system 10 may comprise a plurality of sensors 12, whether of the same type or a combination of different types of sensors 12.

Figure 1B:
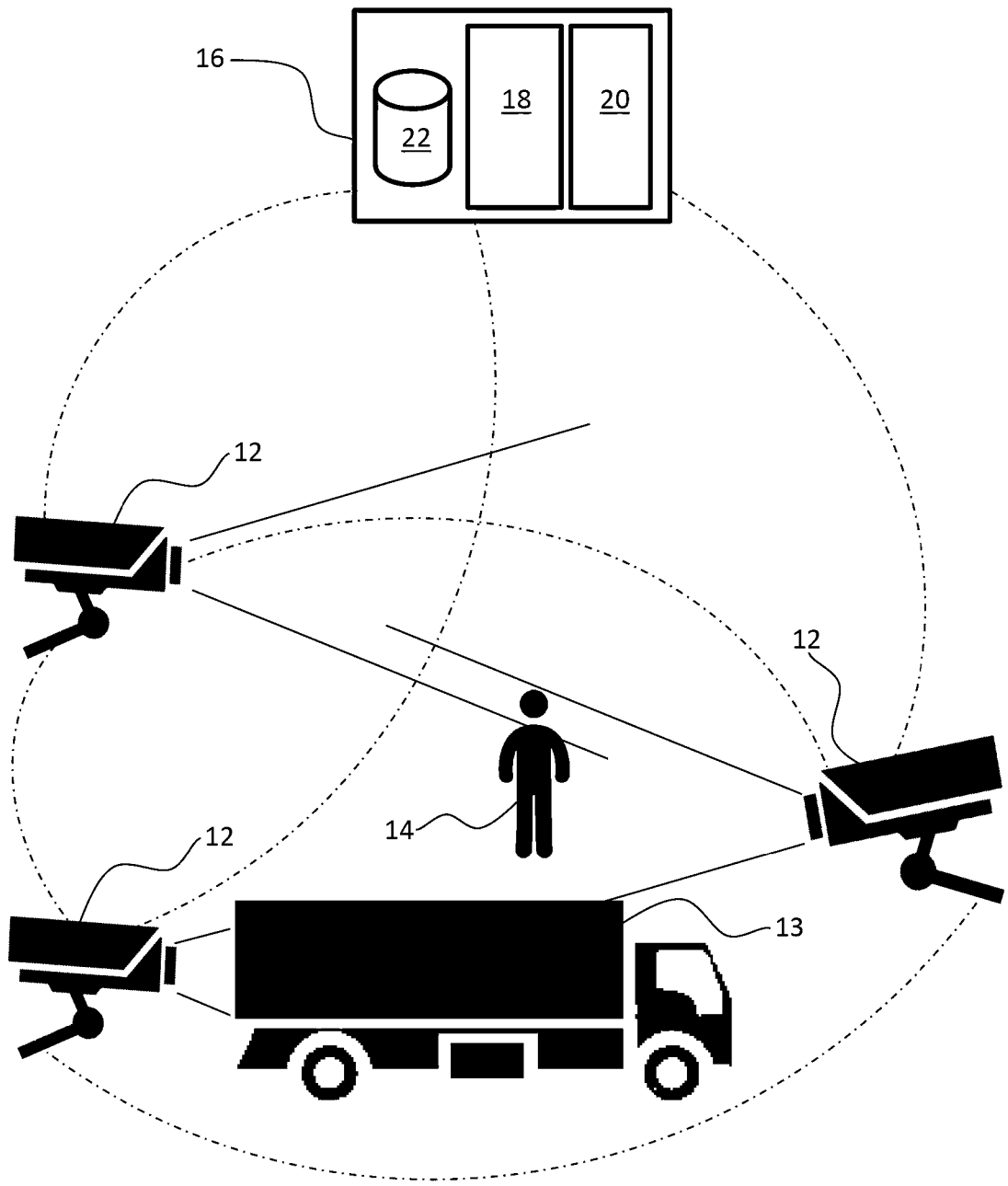
FIG. 1B is a variation of the system shown in FIG. 1A comprising an alternative arrangement and configuration of sensors.

FIG. 1B shows another embodiment of the system 10 whereby common reference numerals indicate common features, the system 10 including a plurality of the sensors configured as a plurality of the cameras 12. The cameras 12 are communicatively connected to form a network or mesh of the sensors 12. This involves each camera 12 being configured to communicate with the processor 18 and with at least some of the other cameras 12, thereby allowing sensitivity/accuracy of sensing to be enhanced by reducing redundancy in sensing operations. Each camera 12 includes a controller for controlling operation of the camera 12. In some scenarios, a signal communicated between the cameras 12 causes operation of at least one of the controllers to effect control of the respective camera 12. For example, a signal communicated between two of the cameras 12 cause one of the cameras 12 to adjust its focus to widen its field of view.

Communication of the cameras 12 with each other. and with the processor 18. is achieved by configuring each camera 12 according to a standardised communication protocol of which many examples are known and are not necessary to describe in this specification. This means that bespoke sensors, such as the cameras 12 which are specifically configured for the system 10, and generic sensors, such as OEM or other third party devices, which are not necessarily configured according to the system 10, can be configured to communicate with each other and the processor 18. This therefore increases scope of use of the system 10 as pluralities of like and/or different sensors can be configured to form an interconnected mesh of sensors.

In the embodiment shown in FIG. 1B, the plurality of cameras 12 are arranged so that a field of view of each camera 12 overlaps with the field of view of one or more of the other cameras 12. In this arrangement, communication between the cameras 12 ensures that if one camera 12 is unable to detect the object 14, for example, due to the field of view being obscured by a truck 13, the data detected by the other cameras 12 is combined by the processor 18 to form the digital representation of the object 14.

It will be appreciated that the embodiment shown in FIG. 1B is one example of the system 10 comprising a networked mesh of sensors 12 and the system 10 may alternatively be configured to comprise different sensors 12, including a combination of different types of sensors 12. For example, the sensors 12 may alternatively be configured as a plurality of proximity sensors 12 and networked to communicate with each other to ensure successive detections (accumulative sensing) of the object 14 reduce redundancies. For example, this may involve a first proximity sensor 12 recording a partial detection of the object 14 due to the object 14 moving rapidly past the sensor 12, causing the first sensor 12 to communicate with other local proximity sensors 12 to prepare the other sensors 12 to detect the approaching object 14. The processor 18 then combines data detected by the other sensors 12 to form the digital representation of the object 14.

In some embodiments of the system 10, the data which forms the digital representation of the object 14 is augmented by contextual data detected directly by further sensors (not illustrated) and/or indirectly by being retrieved from a database or a data feed. Contextual data generally includes data relating to an environment in which the object 14 is located, including time of day in that environment, and/or behaviour of the object 14, and/or behaviour of other objects associated with or arranged near to the object 14.

For example, the contextual data may include local weather information associated with the object 14, such as wind speed, wind direction, and/or humidity, to enable the system 10 to detect a context in which the object 14 resides. The weather information may be detected directly, such as by pressure and humidity sensors arranged near the object 14, and/or indirectly, such as from weather information published by a meteorological office website and retrieved via the Internet. This contextual information may also include historical contextual data, such as historical local weather conditions, to enhance contextualising of the object 14.

Alternatively or additionally, the contextual data may include local behaviour related information, such as the static or dynamic position of one or more objects, for example, a speed and direction a crane is moving, and/or relative position of two or more objects, for example, a proximity of the crane to a power line.

It will be appreciated that contextualising of the object 14 is not limited to assessing local environmental and behavioural conditions and many other factors may be detected, monitored and/or interpreted by the system 10. For example, where the detected object is a machine, this may involve monitoring a functional status of one or more components of the machine, comparing the machine to a digital model of the machine, reviewing quality assurance information, reviewing defect information, reviewing historical data relating to any of these factors, or the like.

The server 16 may be arranged locally to the object 14, for example, embodied in a personal computing device, such as a laptop computer or tablet computer, or remotely from the object 14 and accessed via the Internet. When the server 16 is embodied as a local personal computing device, this device may also provide the user interface 24 and/or the alert device 26. It will be appreciated that components of the server 16, such as the database memory 22, may be located remotely from other components of the server 16 and accessed via the Internet (referred to as 'cloud computing' or 'edge computing').

The program memory 20 is communicatively coupled with the processor 18 and stores a set of instructions which, when executed by the processor 18, causes an object identification technique to be executed. Various object identification techniques are discussed in greater detail below. The instructions for each technique may alternatively be embedded in the processor 18 or embedded in other appropriate forms, such as a computer-readable storage medium (e.g. a non-transitory storage medium). It will be appreciated that whilst a single processor 18 is discussed, the processor 18 may comprise multiple processors to enhance computational efficiency.

The data store, illustrated in FIGS. 1A and 1B as the database memory 22, is communicatively coupled with the processor 18 and stores reference data relating to one or more signatures defined by the defined object. The signatures are derived by each technique responsive to one or more training processes and/or feedback data, and are discussed in greater detail below.

In the embodiment shown in FIG. 1A, the user interface 24 is provided by operating a tablet computer as this is convenient to use in a range of different environments. It will be appreciated that other personal computing devices, such as laptop computers, smartphones, phablets, or the like are also suitable. The user interface 24 typically displays the digital representation detected by the sensor, in the embodiment shown, being RGB images recorded by the camera 12, and displays or emits a notification when the detected object 14 is determined by the processor 18 as being the defined object. In some embodiments, the user interface 24 also comprises the alert device 26.

Displaying or emitting the notification, by the interface 24, may involve causing an SMS message, email message or push notification to be sent to a user's device, such as the tablet computer executing the user interface 24 or a user's smartphone, to notify the user of the presence of the defined object proximal to the sensor 12. The notification is typically configured to prompt a user to take an action. For example, the notification may alert the user to the presence of an unauthorised object, e.g. a person, in a restricted access area, and prompt the user to remove the unauthorised object from the area.

In the embodiment shown in FIG. 1A, the processor 18 is in communication with an alert device 26 configured, in this embodiment, as an audible alarm 26, and the system 10 is configured to operate the alarm 26 responsive to identifying the object 14 as the defined object. This arrangement is useful, for example, in a construction site or factory, where the system 10 is configured so that detection of the defined object 14 is defined as an emergency situation. In this scenario, detection of the defined object 14 causes operation of the alarm 26 to clearly communicate immediate danger to users/workers.

Figure 1C:
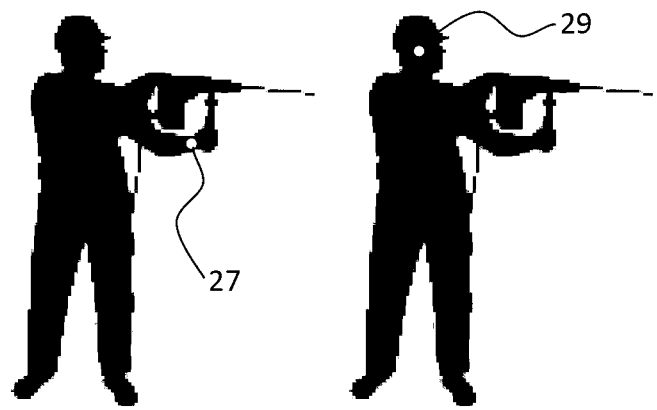
FIGS. 1C and 1D illustrate various embodiments of an alert device, being a wristwatch, ear-piece, joystick and monitor.

The alert device 26 may be embodied in a variety of embodiments and is generally configured to provide an appropriate and specific stimuli to elicit a specific action to be executed by a user. As shown in FIG. 1C, in some embodiments the alert device 26 is embodied as a wearable device, in the embodiments shown being a bracelet/wristwatch 27 and ear-piece 29, both configured to communicate the notification to the wearer by one or more of vibrating, emitting light and emitting sound. Alternatively, the alert device may be configured as an arm band, eyewear, hat/helmet or the like.

The wearable device embodiment and communication method is generally configured responsive to a usage environment of the alert device 26. For example, where the wearable device 26 will be used by a user driving a vehicle in a construction site, which is typically a noisy and brightly coloured environment, the device 26 is configured to communicate via vibration only and worn on a location spaced apart from vibrating vehicle components, such as a steering wheel, and therefore embodied in a pendant worn around the user's neck, or in a headband of a protective helmet.

In some embodiments, the system 10 is configured so that the processor 18 categorises/prioritises the notification, such as relative to predefined risk levels, and the notification is communicated by the alert device 26 to the user according to the categorisation. For example, where the notification is categorised as low risk, such as due to a vehicle being determined by the processor 18 as being within 5 m of a boundary, the device 26 emits a low frequency vibration pulse. Alternatively, where the notification is categorised as high risk, such as due to the processor 18 determining the vehicle as being within 1 m of the boundary, the device 26 emits a high frequency vibration pulse and sound. It will be appreciated the alert device 26 may also be configured to vary vibration patterns responsive to receiving notifications, allowing continuous communication of notifications, and categorisation of each notification, to the user.

Figure 1D:
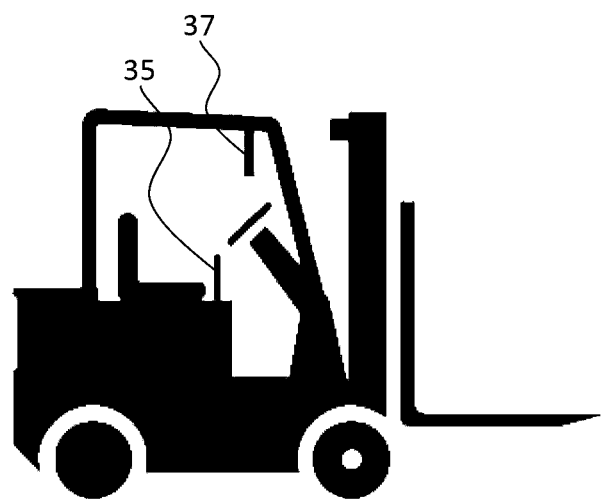

As shown in FIG. 1D, in other embodiments the alert device 26 is embodied as a haptic component of equipment or a vehicle, in the embodiment shown being a joystick 35 configured to emit a vibration pattern when the notification is generated. Alternatively, the alert device 26 may be embedded in other control peripherals, such as a pedal, lever, or steering wheel. Further alternatively or additionally, the alert device 26 is configured as a visible beacon connected to equipment or a vehicle in line of sight of an operator, in the embodiment shown being a display monitor 37.

Alternatively or additionally, the alert device 26 may be configured as, or communicatively connected to, a control module configured to automate operation of equipment or a vehicle, such as an excavator. For example, generating the notification may cause the alert device 26 to operate the control module to immediately cease or otherwise affect operation of the excavator, such as preventing the bucket from moving.

Figure 2:
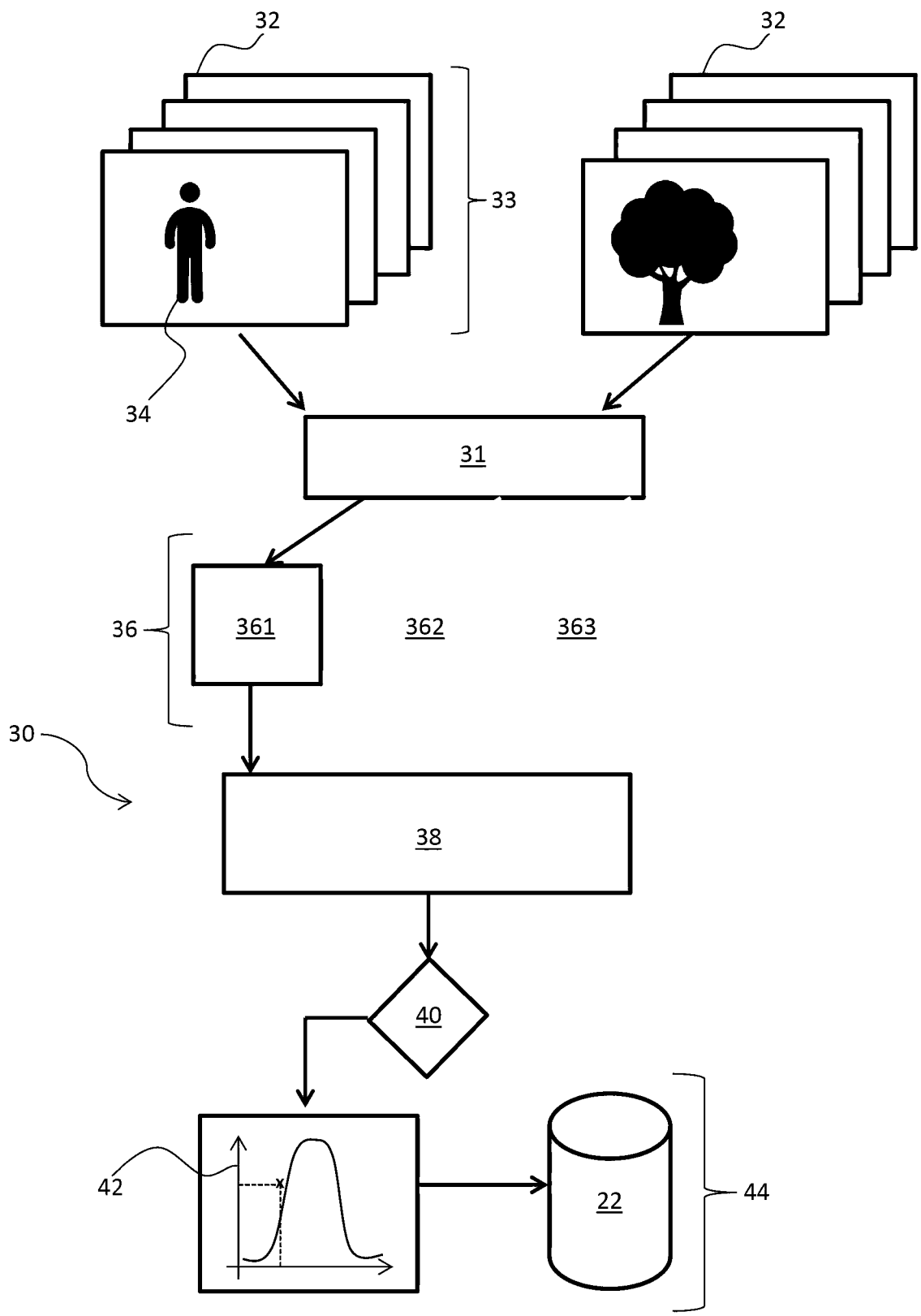
FIG. 2 is a diagram of a training process for training the system shown in FIG. 1 to identify the defined object.

FIG. 2 illustrates various stages of a training process 30 for training one of the object identification techniques, executed by the processor 18, to identify the defined object which, once again, in the example shown in FIG. 2, is a person 34. The training process 30 involves a machine learning process and is typically executed at least once for each object identification technique the processor 18 is configured to execute, prior to operation of the system 10. This allows each technique to learn the signature defined by the defined object and generate the reference data. The reference data comprises a range of feature data derived from variations of the signature which each technique is exposed to and learns to identify.

Initially, at 31, the training process 30 involves exposing the processor 18 executing the object identification technique to a range of training data 32, whereby only a subset 33 of the training data 32 defines the defined object, and confirming which portion of the data is the subset 33 including the defined object. Typically, this involves a user manually configuring the training data 32 by collating a number of digital representations depicting different scenarios and labelling each representation which depicts the defined object, thereby allowing the technique to confirm, from the label, which portion of the training data includes the defined object and therefore derive the signature from this portion of the training data. In this way, the technique learns specific common element(s) in the relevant digital representations which the technique determines define the signature of the defined object.

For example, where a technique is configured to identify commonly shaped vectors defined in an image, the processor 18, by executing the technique, is predisposed to learn the signature of the defined object (the person 34) to be a geometry-based signature such as a vector defined by at least a portion of the person 34, for example, a head-shoulder interface. In this scenario, the user prepares a number of photographic images showing head-shoulder interfaces of various people 34, and a number of photographic images not showing any people, and labels the images according to the presence or absence of the person 34 (the defined object). This process is typically enhanced by selecting highly distinguishable images, for example, some images showing a head and shoulder profile of a single person 34 in front of a plain, white background, and other images showing other objects, such as a donkey, in front of a plain, white background. Alternatively or additionally, this may involve preparing pairs of images, where one of the pair depicts a scene not including the person 34, such as a construction site, and the other one of the pair depicts the same scene but also includes a head and shoulder profile of the person 34.

Alternatively, where a technique is configured to identify motion paths in video footage, the processor 18, executing the technique, is predisposed to learn the signature of the defined object to be a behaviour-based signature, such as relative motion defined by at least a portion of the person 34 moving, for example, a gait of the person 34, and motion defined by at least a portion of another object moving, for example, a moving excavator bucket. In this scenario, the user prepares a number of videos of persons 34 walking close to moving machinery, and number of videos of persons 34 walking a safe distance away from moving machinery, and labels the videos which define the person 34 in the hazardous situation (the defined object).

Further alternatively, in the above embodiment where the processor 18, executing the technique, is predisposed to learn the signature of the defined object to be a behaviour-based signature, the signature may be derived at least partially based on the contextual information defined by the digital representation. For example, in this scenario, the user prepares a number of videos of persons 34 located in a windy environment, where objects such as trees are moving due to the wind (defining contextual data), and in which loose objects are arranged (also defining contextual data), and number of videos of persons 34 located in a still environment, and labels the videos which define the person 34 in the hazardous situation (the defined object).

These approaches allow the respective technique to distinguish one or more common elements in the labelled training data 33 which define the signature of the defined object. Responsive to the training data 32 being supplied to the processor 18 at 31, the processor 18, executing the technique, commences an analysis of the data to learn common elements defined by the data which define the signature and therefore indicate the presence of the defined object. This typically involves the processor 18 executing a three stage analysis of each digital representation to determine if the representation includes the signature.

A first analysis stage 36 involves assessing the digital representation to identify potential signature candidates, that is any aspect(s) of the digital representation which could possibly be the signature or a portion thereof. This typically involves segmentation of the digital representation to identify any aspect of the representation which complies with defined parameters. This is typically conducted by a segmentation algorithm scanning the digital representation and identifying all signature candidates 361, 362, 363. For example, this may involve a coarse geometry scan to identify any geometry defined by the representation which fits within defined geometric boundaries, and identifying relevant geometry as the signature candidates 361, 362, 363. Alternatively or additionally, this may involve a coarse behaviour scan, such as analysing motion paths, and/or context scan, such as analysing directly and/or indirectly sourced contextual information, to identify relevant factors as the signature candidates 361, 362, 363.

A second analysis stage 38 involves deriving feature data from each identified signature candidate. This is typically conducted by a feature extraction algorithm to generate a numerical representation of the signature candidate features (a feature vector). For example, this may involve deriving a ratio from at least two geometric dimensions defined by a signature candidate.

A third analysis stage 40 involves consulting the label of the digital representation which the feature data has been derived from to confirm whether the defined object is present in the representation and, if the label confirms the defined object is present, recording the feature vector of the signature candidate being assessed in a feature data variance distribution 42.

For each feature vector which the processor 18 confirms, from the label of the representation, as corresponding with the defined object, this may cause the processor 18 to plot the feature vector on a graph, for example, plotting a feature vector value on an 'x' axis and a probability value on a 'y' axis. The range of plotted feature vectors typically forms a probability distribution curve, such as a Gaussian curve, defining one or more peaks corresponding with the most similar feature vectors. Alternatively, the feature variance distribution 42 may be expressed as another appropriate probability distribution function, for example, where a technique is configured to assess two different features, for example, hair colour (first feature) and eye colour (second feature) of a person, the corresponding feature vectors may be plotted on separate axes on the same graph to form two overlaid Gaussian curves. Similarly, three features may be plotted on three axes of a three-dimensional graph. It will be appreciated that a Gaussian curve is one example of a probability distribution function and the feature variance distribution may define other probability distribution functions. It will also be appreciated that where multiple signature candidates 361, 362, 363 are identified in the digital representation, the second analysis stage 38 and third analysis stage 40 are executed for each signature candidate 361, 362, 363.

Finally, at 44, regardless of the form of the feature variance distribution 42, the distribution 42 is communicated to and stored in the database memory 22 as the reference data.

The quantity and variation of training data 32 to which the processor 18 is exposed at least initially affects the reference data stored in the database memory 22, depending on whether the system 10 is also configured to operate a feedback loop, as discussed below. For example, if the training data 32 includes a large number of digital representations defining substantially similar signatures 33, the feature variance distribution will likely be expressed as a dense and narrow spread. Alternatively, if the training data 32 includes digital representations defining significantly different variations of the signature 33, the feature variance distribution will be expressed as a correspondingly broad spread.

It will be appreciated different techniques are typically configured to determine the signature of the defined object 34 which is defined in the digital representations of the labelled training data 33 from a different aspect or characteristic of the defined object 34. For example, one technique may be configured to derive the signature from geometry of part or all of the object 34. Similarly, another technique may be configured to derive the signature from other observable and/or detectable properties of the object 34, such as colour of a portion of the object 34 (such as clothing), temperature of the object 34, weight of the object, or the like. Alternatively, another technique may be configured to derive the signature from behaviour of the object 34, which may be responsive to movement of object 34, inactivity of the object 34, movement of another object relative to the object 34, and/or a response of the object 34 responsive to a stimuli, such as a change in facial expression or gaze direction responsive to a loud noise. Further alternatively, another technique may be configured to derive the signature from context factors associated with the object 34. The training data 32 is therefore adapted according to the configuration of a technique so that the technique is provided with relevant data to allow the signature to be derived, and the reference data generated. Furthermore, the training process 30 is typically executed for each technique which is executable by the processor 18 using training data 32 which defines the same defined object 34, thereby allowing each technique to learn a signature defined by a common object.

In some embodiments of the system 10, deriving the signature by the processor 18 executing one of the techniques may be based on a combination of factors, including a property of the defined object 34, geometry of the defined object 34, behaviour of the defined object 34 and context associated with the defined object 34. For example, where the defined object is intended to be the person 34 in close proximity to moving equipment and not paying attention/being inactive, the training data 32 is configured to include a first set of videos of persons fleeing from moving machinery, or attempting to alert others to imminent danger, such as waving arms, and a second set of videos of persons standing stationary close to moving machinery, such as due to using a mobile phone or being unconscious, and the second set is labelled as the digital representations including the defined object 32. In this scenario, through exposure to the training data 32, the technique learns the signature to comprise the combination of something shaped like the person 34 (geometry), being inactive (behaviour), and being near to objects moving towards it at an approximate speed, direction and emitting a particular sound (context).

In some embodiments of the system 10, the training process 30 is repeated multiple times in order to train at least some of the techniques to identify a range of different defined objects. For example, a first training process may be configured to train each technique to identify cars, and a second training process be configured to train each technique to identify boats. In this scenario, the generated reference data for each technique is arranged in the database memory 22 as a filterable database categorised by factors, the factors including the different defined objects (cars and boats) which the technique has been trained to identify. Furthermore, to enable manual filtering of the reference data, the user interface 24 is configured to provide a menu to allow the user to select which defined object the user wants the system 10 to identify. For example, in the above scenario, the interface 24 enables the user to select whether the techniques are attempting to identify cars and/or boats, therefore filtering the database accordingly and affecting the reference data which the techniques can access.

It will be appreciated that the above example is a simple example of how the system 10 can be configured to identify a specific defined object and, due to executing many training processes, the reference data may be more complex, allowing multiple layers of filtering to allow the user to precisely adjust how the system 10 operates. For example, the reference data may be configured to allow the user, operating the user interface 24, to select a first layer, being a use environment such as a building construction site, a road, or a marina, which would mean that each technique executed by the processor 18 would attempt to identify all objects which it has been trained to identify and relate to that use environment. The user may also select a second layer, being a category of objects associated with the use environment, for example, ground engaging equipment. The user may also select a third layer, being as a specific object within the use environment, for example, an excavator. By selecting the various layers of reference data the user therefore affects the reference data accessible by the techniques and therefore affects how the techniques will function.

For example, the reference data and user interface 24 may be configured to allow the user to select marinas and all boats, causing the processor 18, executing the techniques, to determine when any boat is within range of the sensor(s) 12, responsive to identification of the relevant signature(s). Alternatively, the user, operating the user interface 24, may refine the system 10 settings so that the processor 18, executing the techniques, determines when a dockyard crane is within 3 m of any non-commercial boat, such as a private yacht.

Figure 3A:
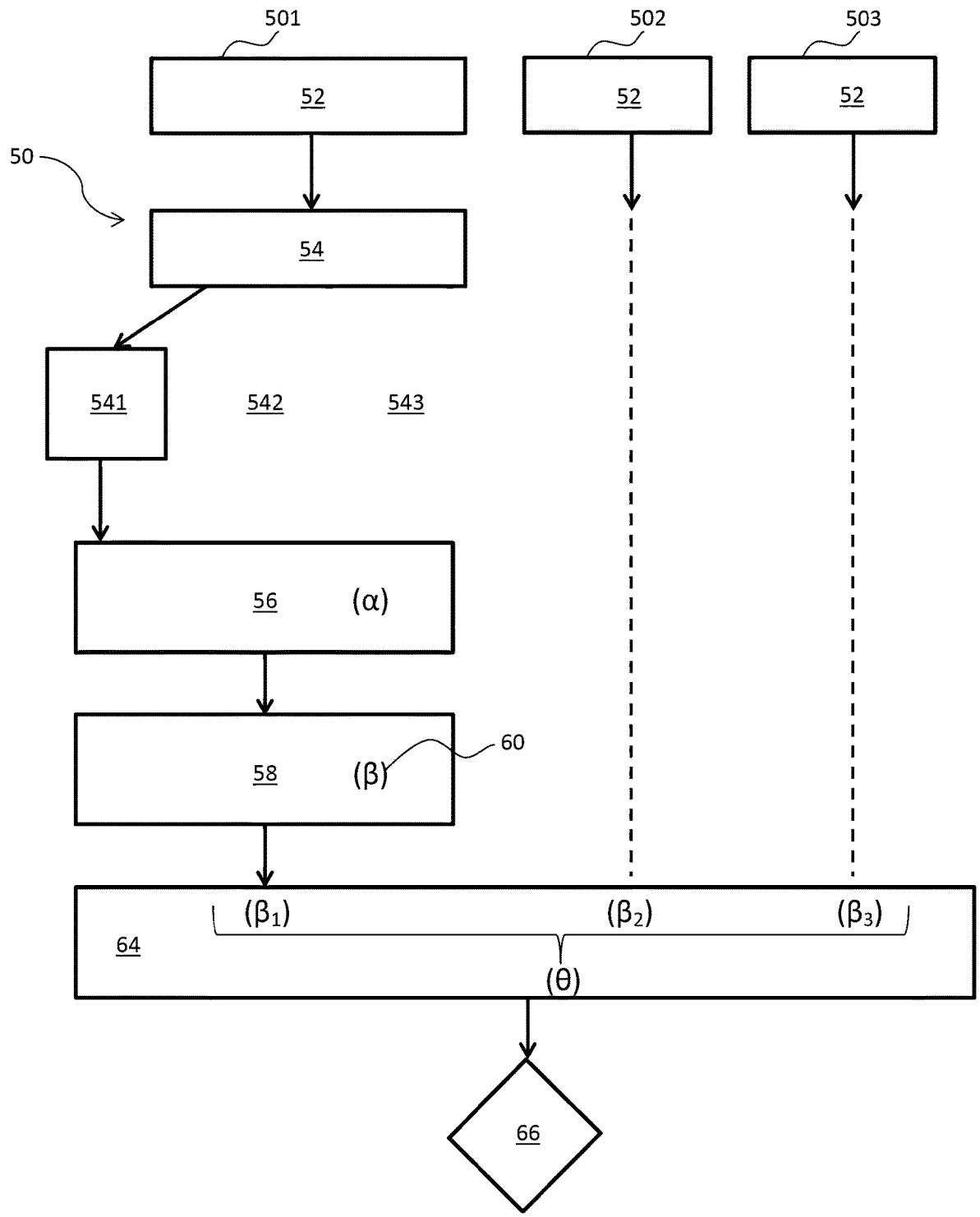
FIG. 3A is a flow chart illustrating operation of the system shown in FIG. 1.

FIG. 3A illustrates various stages of an operation process 50 for the system 10 whereby the system assesses whether the object 14 detected by the sensor 12 is the defined object. At least a portion of the operation process 50 is executed by each object identification technique 501, 502, 503 the processor 18 is configured to execute.

At a first stage 52, the sensor 12 detects data to define at least one digital representation of the object 14. In the embodiment shown in FIG. 1, this involves the camera 12 capturing at least one image of the person 14 when the person 14 is within a focal range (field of view) of the camera 12. It will be appreciated that this may involve capturing video footage, which comprises many images (frames). Each digital representation is provided by the camera 12 to the processor 18 and each technique 501, 502, 503 is executed by the processor 18, simultaneously or approximately simultaneously, to allow each technique 501, 502, 503 to assess at least one common digital representation.

At a second stage 54, the processor 18 executes a first technique 501 causing a segmentation process to be executed in relation to one digital representation, typically by executing a segmentation algorithm, to identify any signature candidate defined in the digital representation. In the embodiment shown, the technique 501 identifies three signature candidates 541, 542, 543. Each signature candidate 541, 542, 543 is an aspect of the digital representation which the technique 501 determines could be the signature which the technique 501 has previously derived during the training process, as described above. The segmentation of the digital representation by the technique 501 to identify the signature candidates 541, 542, 543 will depend on the characteristics of the signature defined by the technique 501 responsive to the training data 32 and/or predefined operating parameters of the technique 501. For example, the technique 501 may have defined the signature as being a geometry-based signature and therefore segmentation involves identifying geometry in the representation which could correspond with the geometry-based signature, such as any geometry which is within predefined geometric ranges or thresholds.

At a third stage 56, the processor 18 executes the feature extraction algorithm to derive a feature vector ($\alpha$) for each identified signature candidate 541, 542, 543.

At a fourth stage 58, the processor 18 executes a comparator, typically being a classifier or a finding algorithm, to compare each derived feature vector ($\alpha$) with the feature variance distribution defined by the reference data.

At a fifth stage 60, the comparator derives a likelihood value ($\beta$) from a relative position, or other statistical relationship, of the compared feature vector ($\alpha$) and the reference data. The likelihood value ($\beta$) indicates a likelihood that the compared feature vector ($\alpha$) is the same as, or similar enough to, the signature which the technique 501 has learnt, from the training data 32, as being defined by the defined object. For example, where the feature variance distribution, formed by the reference data, is expressed as a graph defining a single Gaussian curve 62, the comparator may plot the feature vector ($\alpha$) on the graph and determine the likelihood value ($\beta$) from a proximity of the plotted feature vector ($\alpha$) to the curve and/or a peak of the curve. Alternatively, where the feature variance distribution is expressed as two or more overlaid Gaussian curves, or other distribution functions, which may form a cloud-type distribution, the comparator may plot the feature vector ($\alpha$) and determine the likelihood value ($\beta$) from a proximity of the plotted feature vector ($\alpha$) to a region of maximum density defined by the overlaid curves. It will be appreciated that the likelihood value ($\beta$) depends on the feature variance distribution defined by the reference data, whereby a higher likelihood value ($\beta$) is determined according to a relative similarity of the assessed feature vector ($\alpha$) to other substantially similar reference feature vectors which the processor 18 has, through exposure to the training data 32, confirmed define the signature.

At a sixth stage 64, at least some of the likelihood values ($\beta$) derived by the techniques 501, 502, 503 executed by the processor 18 are combined to derive a composite value ($\theta$). Typically a likelihood value ($\beta$) derived by at least two different techniques 501, 502, 503 are combined to derive the composite value ($\theta$). The combination (fusion) stage may involve a range of different likelihood value ($\beta$) combination methods. For example, the combination stage may be configured to be executed periodically, such as at every second, whereas each technique 501, 502, 503 may be configured to be executed periodically at every fifth of a second, and therefore derive five likelihood values ($\beta$) each second. In this scenario, the combination stage may involve combining the highest likelihood value ($\beta$) derived by each technique 501, 502, 503 during the previous second. Alternatively, in this scenario each technique 501, 502, 503 may also include an averaging function configured to average likelihood values ($\beta$) derived in a defined period, such as a second, and therefore the combination stage involves combining the average likelihood value ($\beta$) derived by each technique 501, 502, 503 during the previous second.

At a seventh stage 66, the system 10 decides, based on the composite value ($\theta$), whether the object 14 detected by the at least one sensor and defined in the digital representation is the defined object.

It will be appreciated that the fourth and fifth stages 58, 60 may be repeated by each technique 501, 502, 503 for each feature vector ($\alpha$) derived by the respective feature extraction algorithm in the third stage 56, allowing the system 10 to assess whether any signature candidate which each technique 501, 502, 503 identifies corresponds with the signature which the respective technique has learnt is defined by the defined object.

Combining likelihood values ($\beta$) in the sixth stage 64 to derive the composite value ($\theta$) typically involves multiplying the likelihood values ($\beta$), as this increases a difference between a low composite value ($\theta$) derived from low likelihood values ($\beta$) and a high composite value ($\theta$) derived from high likelihood values ($\beta$). The composite value ($\theta$) therefore provides a clear indication of confidence of the system 10 of identifying the defined object.

Alternatively, where the feature variance distribution for each technique 501, 502, 503 is significantly concentrated, for example, defines a steep Gaussian curve, output likelihood values ($\beta$) are typically either very high (in the order of hundreds or thousands) or very low (in the order of single figures or less than 1), allowing a virtual binary likelihood value ($\beta$) to be derived. In this scenario, the combination stage 64 may involve a voting scheme, where a high likelihood value ($\beta$) results in a single vote, and low value results in no vote. The votes are then added together to derive the composite value ($\theta$).

Figure 3B:
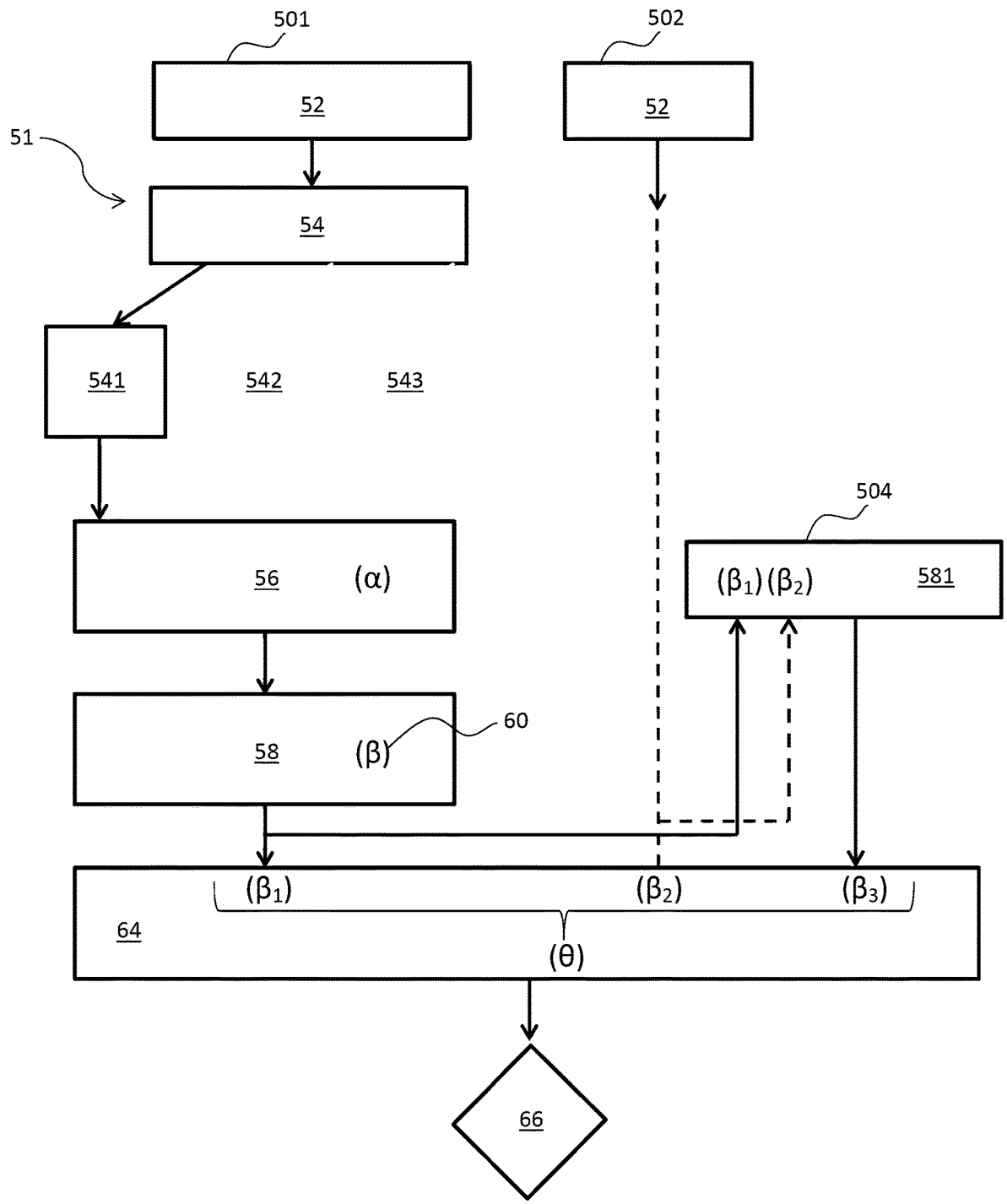
FIG. 3B is a flow chart illustrating an alternative aspect of operation of the system shown in FIG. 1.

FIG. 3B shows an operation process 51 for an alternative configuration of the system 10, whereby common reference numerals indicate common features. The system 10 is configured to execute two of the techniques 501, 502 illustrated in FIG. 3A, referred to as primary techniques in this embodiment of the system 10, and also configured to execute a secondary technique 504. The primary techniques 501, 502 are configured to derive a likelihood value ($\beta$) responsive to data provided from the at least one sensor 12, the data being the at least one digital representation of the object 14. The secondary technique 504 is configured to derive a further likelihood value ($\beta_n$) responsive to data provided by one or more of the primary techniques 501, 502. This involves each primary technique 501, 502 being executed as described above to derive likelihood values ($\beta_1$, $\beta_2$) and these likelihood values ($\beta_1$, $\beta_2$) being provided as input to the secondary technique 504. Typically, at least two primary techniques 501, 502 are executed to allow at least one likelihood value ($\beta_1$, $\beta_2$) to be provided from each primary technique 501, 502 to the secondary technique 504. The secondary technique 504 is then executed, by the processor 18, causing the likelihood values ($\beta_1$, $\beta_2$) to be compared at stage 581 and a further likelihood value ($\beta_3$) to be derived as a result.

The comparison of input likelihood values ($\beta_1$, $\beta_2$) by the secondary technique 504 at 581 may involve executing a comparator, such as a classifier, to determine a correlation between the likelihood values ($\beta_1$, $\beta_2$). This correlation may indicate, for example, that a high likelihood value ($\beta_n$) has been derived by each of the primary techniques 501, 502 responsive to assessing an identical or similar portion of the digital representation. This therefore indicates a high likelihood of the signature of the defined object being present, regardless of how each primary technique 501, 502 defines the signature, in the same portion of the digital representation, consequently increasing confidence of the system 10 that the defined object is present in that portion of the representation. Execution of the secondary technique 504 therefore effectively verifies the likelihood values ($\beta_1$, $\beta_2$) of the primary techniques 501, 502, by determining any agreement between the techniques 501, 502 regarding presence of signature and therefore presence of defined object. It will be appreciated that spatial correlation is only one example of the comparison stage and other correlations are within the scope of the secondary technique 504. Another example may involve making use of known features of the environment. It may be known that, in the case of recognition of people in the environment, what has been detected could not be a person since in the region where the detection occurred, a person could not be located. For example, there may be no floor in that region.

Figure 3C:
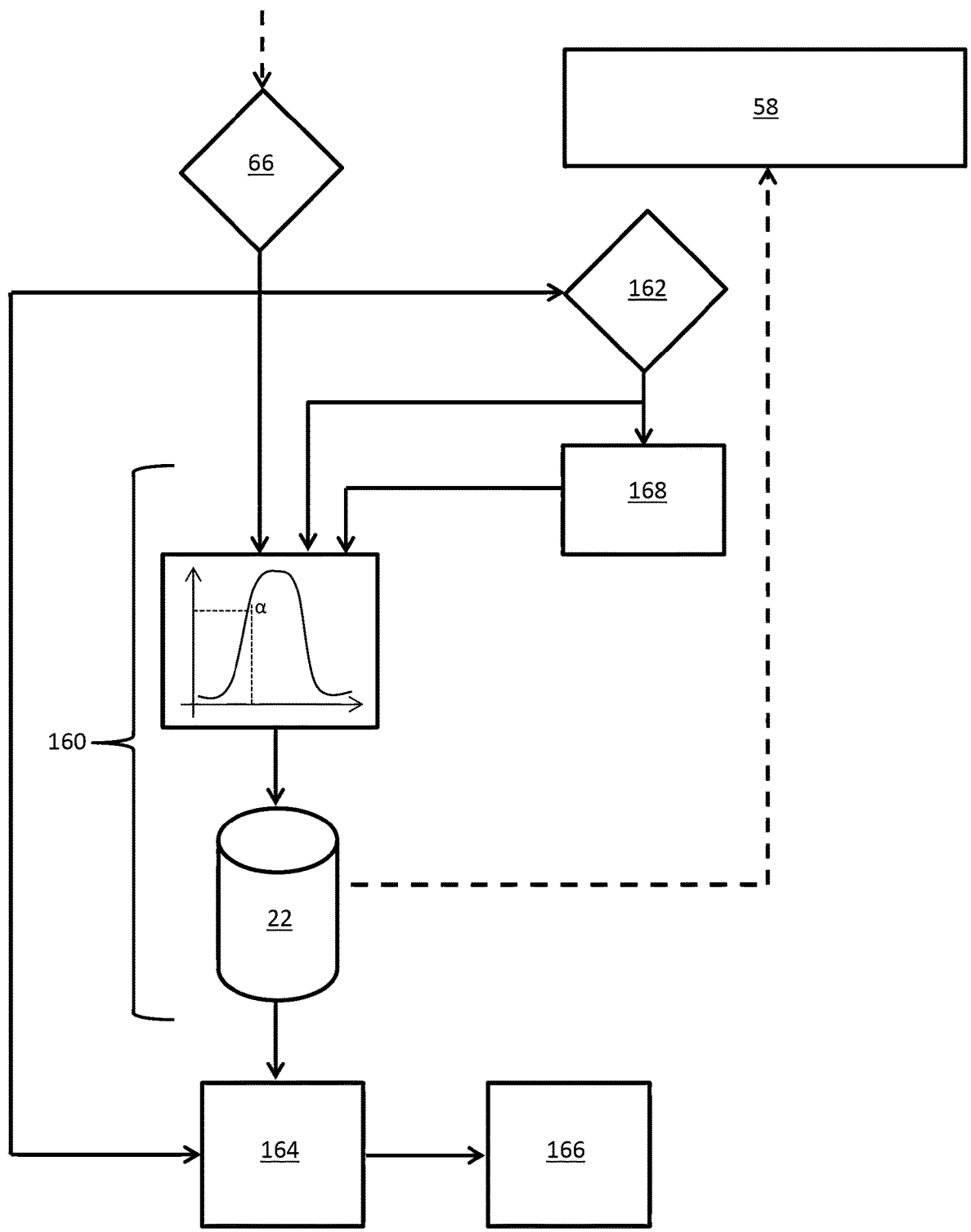
FIG. 3C is a flow chart illustrating a further alternative aspect of operation of the system shown in FIG. 1.

FIG. 3C shows another embodiment of the process 50 shown in FIG. 3A or the process 51 shown in FIG. 3B, whereby common reference numerals indicate common features or steps. In this embodiment, the system 10 also comprise a feedback loop 160 configured to add additional feature data to the reference data stored in the database memory 22 responsive to the processor 18 positively identifying the detected object 14 as the defined object at stage 66.

In this embodiment, on each occasion that the processor 18 executing the techniques 501, 502, 503 determines a positive identification of the defined object, the processor 18 records the feature data ($\alpha$) derived by each executed technique 501, 502, 503, which contributed to the positive identification, in the feature variance distribution for the respective technique 501, 502, 503, and stores this as a new version of the reference data in the memory 22, essentially repeating stages 42 and 44 of the training process 30 shown in FIG. 2. The revised reference data is then accessible at the comparator stage 58 of the operation processes 50, 51 described above.

Operating in this way continuously increases the range of data forming the reference data sets, consequently increasing the quantity of substantially corresponding feature vectors ($\alpha$) in each feature variance distribution. This has the effect of increasing the accuracy of each technique 501, 502, 503, as the signature is more clearly defined by the range of feature vectors ($\alpha$) in the reference data. The feedback loop 160 therefore provides an iterative process which progressively enhances accuracy of the system 10 through repeated use of the system 10, effectively enabling each technique 501, 502, 503 to continuously refine the signature and therefore precisely identify when the defined object is present in the digital representation.

In some embodiments, the feedback loop 160 comprises an additional stage of, following a positive identification of the defined object by the processor 18 at stage 66, the processor 18 seeks user confirmation, at stage 162, by the user operating the user interface 24, to confirm if the feature data should be recorded in the database memory 22 as reference data. This involves the user interface 24 being configured so that responsive to the system 10 determining the detected object 14 is the defined object at stage 66, the user is prompted, by the user interface 24, to confirm if this determination is correct. In this supervised learning scenario, the processor 18 only adds the feature vector ($\alpha$) to the reference data responsive to receiving a positive user confirmation at stage 162.

Also shown in FIG. 3C, in some embodiments the system 10 is configured so that following a positive identification of the defined object at stage 66 or operation of the feedback loop 160, the processor 18 seeks user input to an action menu, at stage 164, by the user operating the user interface 24, to confirm an action to be executed by the system 10. This involves the user interface 24 being configured so that operating the action menu 164 allows the user to define one or more actions to be executed by the system 10 responsive to the positive identification. This allows the user to define 'best practice' rules or boundary conditions, for example, to comply with legal requirements, such as health and safety regulations. Similarly this allows the user to optimise functionality of the system 10 with respect to particular circumstances perceived by the user as being significant.

At stage 166, the processor 18 derives instructions from the defined action(s), executes the instructions thereby effecting the action(s), and the instructions are recorded, by the processor 18, in the program memory 20 and/or the database memory 22. This means that the instructions will be executed responsive to the processor 18 subsequently identifying a detected object as being the same defined object which prompted the definition of the action(s).

For example, where the techniques 501, 502, 503 are configured to identify the defined object being an excavator bucket within 1 m of a person, responsive to the processor 18 identifying the defined object, the user operates the action menu to define that the appropriate action is to operate the alert device 26 to cause the excavator to cease operation immediately. This means that on each future occasion that the processor 18 identifies the excavator bucket being within 1 m of a person this action is automatically executed.

Alternatively or additionally, where the techniques are configured to identify the defined object as an excavator bucket within 5 m of any other object, the user operates the action menu to define that when the excavator bucket is within 5 m of power lines the appropriate action is to operate the alert device 26 to emit a discernible alarm.

It will be appreciated that these are simple examples of defining a 'best practice' action and more complex actions, or sequences of actions, may be defined by the user. For example, the user may be an expert in a particular field, and operating the action menu by the expert user enables complex configuration of the system 10 according to the expert user's specific knowledge and experience, thereby embedding this knowledge within functionality of the system 10. Furthermore, operating the system 10 in this way allows the processor 18 to continuously learn how the user prefers the system 10 to operate and adapt functionality of the system 10 accordingly. For example, by continuously monitoring user input ('learning cases'), the processor 18 can identify patterns of user behaviour and derive additional 'best practice' actions or boundary conditions which should be executed responsive to determining a detected object is the defined object, without requiring input from the user.

Also shown in FIG. 3C, in some embodiments the system 10 is configured so that responsive to a positive user confirmation input at stage 162, the processor 18 seeks user input to an indicator menu, at stage 168, by the user operating the user interface 24, to select any indicators which indicate the detected object 14 being the defined object 14, or to deselect indicators which are automatically identified and suggested by the processor 18. An indicator is typically a specific characteristic of the digital representation of the object 14 and is usually a context factor associated with the detected object. For example, indicators may include specific objects, such as people, clothing, equipment, signage, and/or specific behaviours, such as a tree limb bending due to wind indicating strong winds, or relative velocity vectors of forklifts travelling in a warehouse indicating an imminent collision. Responsive to operation of the indicator menu by the user, the processor 18 derives indicator data from each identified indicator, associates the indicator data with the feature vector ($\alpha$) which caused the positive identification at stage 66, and records the associated indicator data as additional reference data in the memory 22.

Operating the system 10 in this way allows the processor 18 to continuously learn features which the user considers to be indicators. By continuously monitoring these 'learning cases', the processor 18 can identify patterns of user behaviour and derive additional indicator data each time the processor 18 determines a detected object is the defined object, without requiring input from the user.

In some embodiments, operation of the system 10 comprises an inference stage as a sub-operation of the comparator stage 58. The inference stage is executed in response to the sensor 12 being exposed to an alternative object which none of the techniques 501, 502, 503 have been trained to identify. When this occurs, the processor 18, executing one of the techniques 501, derives feature data ($\alpha$) from the digital representation of the alternative detected object, at 56, and determines, at 58, by interpolation within the feature variance distribution, that the feature data is sufficiently similar to the reference data to derive a confident likelihood value ($\beta$) and cause a positive identification of the defined object at stage 66. The processor 18 then adds the derived feature data ($\alpha$) to the reference data, as shown at 160 in FIG. 3C. Optionally, the feature data ($\alpha$) is only added to the reference data responsive to receiving positive user confirmation from operation of the user interface 24, essentially being the same process as stage 162.

For example, where the technique 501 is trained during one or more training processes 30 to identify a specific model of vehicle, the sensor 12 may subsequently detect an alternative model of a vehicle which shares the same vehicle platform and consequently has approximately the same geometry and behavioural characteristics. When this occurs, the processor 18, in the comparator stage 58, compares a feature vector ($\alpha$) derived from the digital representation of the alternative vehicle with the reference data and derives a confident likelihood value ($\beta$) from interpolating the feature vector ($\alpha$) as being similar to a majority of the reference data, due to the similar geometry and/or behaviour of the alternative vehicle. This then causes the processor 18 to identify the alternative vehicle as the defined object. The feature vector ($\alpha$) is then added to the reference data, at 160, broadening the range of reference data and effectively re-training the technique 501 to also identify the alternative vehicle model as being the defined object. This process therefore re-trains any of the techniques 501, 502, 503 to infer identification of previously unobserved objects as being the defined object.

In other embodiments, operation of the system 10 comprises a prediction stage as a sub-operation of the comparator stage 58. The prediction stage is executed when the sensor 12 is exposed to an alternative object which none of the techniques 501, 502, 503 have been trained to identify. When this occurs, the processor 18, executing one of the techniques 501, derives feature data ($\alpha$) from the digital representation of the alternative detected object, at 56, and determines, at 58, by extrapolation within the feature variance distribution that the feature data is sufficiently similar to derive a confident likelihood value ($\beta$) and cause a positive identification of the defined object, at 66. The processor 18 then adds the derived feature data ($\alpha$) to the reference data, as shown at 160 in FIG. 3C. Optionally, the feature data ($\alpha$) is only added to the reference data responsive to receiving positive user confirmation from operation of the user interface 24, essentially being the same process as stage 162.

For example, where the technique 501 is trained during one or more training processes 30 to identify a sports utility vehicle (SUV), the sensor 12 may subsequently detect a van which has approximately the same functional features and behaviour as an SUV, such as having four wheels, doors and windows arranged in approximately the same locations, and moving about the same speed and along a similar path. When this occurs, the processor 18, in the comparator stage 58, compares a feature vector (α) derived from the digital representation of the van with the reference data and derives a confident likelihood value (β) from extrapolating the feature vector (α) as being similar to a majority of the reference data, due to the similar features of the van. This then causes the processor 18 to identify the van as the defined object. The feature vector (α) is then added to the reference data, at 160, broadening the range of reference data and effectively re-training the technique 501 to also identify a van as being the defined object (an SUV). This process therefore re-trains any technique 501, 502, 503 to predict identification of previously unobserved objects as being the defined object.

Figure 4:
FIG. 4 is a screenshot of the system shown in FIG. 1 during operation.

FIG. 4 is a screenshot of the system 10 during operation, the system 10 configured to operate four techniques comprising two primary object identification techniques and two secondary object identification techniques, each primary technique configured to identify a person 70 as the defined object. The screenshot illustrates the two primary techniques being executed simultaneously. A first primary technique, named Head Shoulder Signature—Red Green Blue (HSS-RGB), is configured to identify the defined object from a profile of head-shoulder interface of the person 70, detected due to motion of the person 70, and has derived, from previous exposure to training data, the signature as being this profile. A second primary technique, named Histogram of Oriented Gradients (HOG), is configured to identify the defined object from a silhouette of the person 70, detected due to specific pixel variations and patterns of adjacent pixels in an RGB image, and has derived, from previous exposure to training data, the signature being this silhouette shape. The secondary techniques are configured to compare outputs from the primary techniques (HSS and HOG) to identify spatial correlation, that is whether signature candidates derived by each technique are from approximately the same position in the digital representation, and/or temporal correlation, that is whether signature candidates derived by each technique are from approximately the same time (instance) in the digital representation.

Operation of the system 10 configured according to the embodiment shown in FIG. 4 is in accordance with the process 51 set out in FIG. 3B. Typically, this involves initially executing the HSS and HOG techniques, and then executing the two secondary techniques. Operation of each of these techniques is typically performed using an OpenCV platform and is described in further detail below.

Use of the HSS-RGB technique involves, at stage 52, image acquisition from the camera 12, whereby video footage comprising a plurality of still images 72 (frames) is captured. At stage 54, image processing is executed to identify signature candidates, including: at least two frames are converted from RGB to grayscale; a Gaussian blur with a defined kernel is applied to each frame; a difference between the frames is calculated to derive a single image; the image is converted to a binary image 74; a median filter is applied to increase uniformity of the image; a morphology function is executed including dilating the image, eroding the image, and finding contours in the image; the contours are sorted by area; the contours are compared to contour reference data stored in the database 22 to identify contours which fall within defined thresholds, such as a geometry boundary; regions of interest (signature candidates 541, 542, 543) are defined by constructing a bounding box 76 around each candidate. The contour reference data comprises further reference data which the HSS-RGB technique has learnt, or been manually configured, to recognise as defining appropriate contour geometry. Where this is learnt, this may involve the same process of empirically deriving the reference data as described above.

At stage 56, a feature vector is derived for each signature candidate 541, 542, 543, whereby, for each assessed signature candidate the following is executed: derive a span measurement from each row of white pixels within the bounding box 76; derive a shoulder measurement from the largest span; compare the shoulder measurement with shoulder reference data stored in the database 22 to identify where a head of the person should be relative to the span; resize the bounding box accordingly; derive a head measurement from the largest span in the identified head region; derive a head-shoulder span ratio. This ratio is the feature vector (α). The shoulder reference data comprises further reference data which the HSS-RGB technique has learnt, or been manually configured, to recognise as defining a typical geometric relationship between a head a shoulder of a person. Where this is learnt, this may involve the same process of empirically deriving the reference data as described above.

At stage 58, the ratio (feature vector (α)) is compared to the feature variance distribution, previously defined in the training process, to derive a likelihood value (β). This may involve many values (β) being derived each second, allowing the HSS-RGB technique to apply an averaging function, such as a nearest neighbour statistical tracker. This allows the HSS-RGB technique to provide a more confident likelihood value (β) as, for example, it may monitor whether the same signature candidate from which a plurality of likelihood values ((3) have been derived has remained in approximately the same position, i.e. due to a correlation of one value (β) with a nearest neighbour value (β), for a time period, and therefore be more confident these likelihood values (β) are the result of a defined object presence and not an error or other object presence.

It will be appreciated HOG is a known technique and therefore operation of the HOG technique by the system 10 is only briefly described for exemplary purposes. Use of the HOG technique typically involves, at stage 52, image acquisition from the camera 12, whereby typically video footage comprising a plurality of still frames 72 (images) is captured. At stage 54, image processing is executed to identify signature candidates, including: gradient computation; and orientation binning.

At stage 56, for each signature candidate, the following is executed: descriptor blocks 78 are constructed (defined by x, y, height and width measurements); and descriptor blocks 78 are normalised. This derives the feature vectors (α).

At stage 58, a Support Vector Machine (SVM) is executed to derive a likelihood value (β). This again may involve many values (β) being derived each second, allowing the HOG technique to apply an averaging function, such as a nearest neighbour statistical tracker, to provide a more confident likelihood value (β).

The secondary techniques are executed responsive to each primary technique (HSS-RGB and HOG) deriving at least one likelihood value (β). In the embodiment shown in FIG. 4, each secondary technique involves executing a classifier configured as a nearest neighbour statistical tracker. Each of these techniques compares at least two likelihood values (β) to determine potential alignment of a signature candidate in physical space and/or time.

FIG. 4 also illustrates the combination (fusion) stage 64 being executed, where the likelihood values (β) derived by the HSS-RGB and HOG techniques, and the secondary techniques, are combined to derive composite value (θ) 80.

A plurality of composite values (θ) are shown as the system 10 has been executed a plurality of times to determine if an object detected by the camera 12 is the person 70. The combination stage in this embodiment is configured as a voting scheme. The highest composite values (θ) 801 have been derived as each of the HSS-RGB and HOG techniques have derived a high likelihood value (β) indicating the respective signature is likely present in the assessed digital representation, therefore both casting a vote (HSS-RGB vote 1+HOG vote 1=2 (subtotal)), and each of the secondary techniques have also derived a high likelihood value (β) as a strong spatial and temporal correlation between likelihood values derived by the HSS-RGB and HOG techniques has been confirmed, therefore also both casting a vote (secondary vote 1+secondary vote 1+subtotal=4 (total)). Where the vote (composite value (θ)) totals four, the system 10 is at maximum confidence that the defined object (person 70) has been identified.

Figure 5:
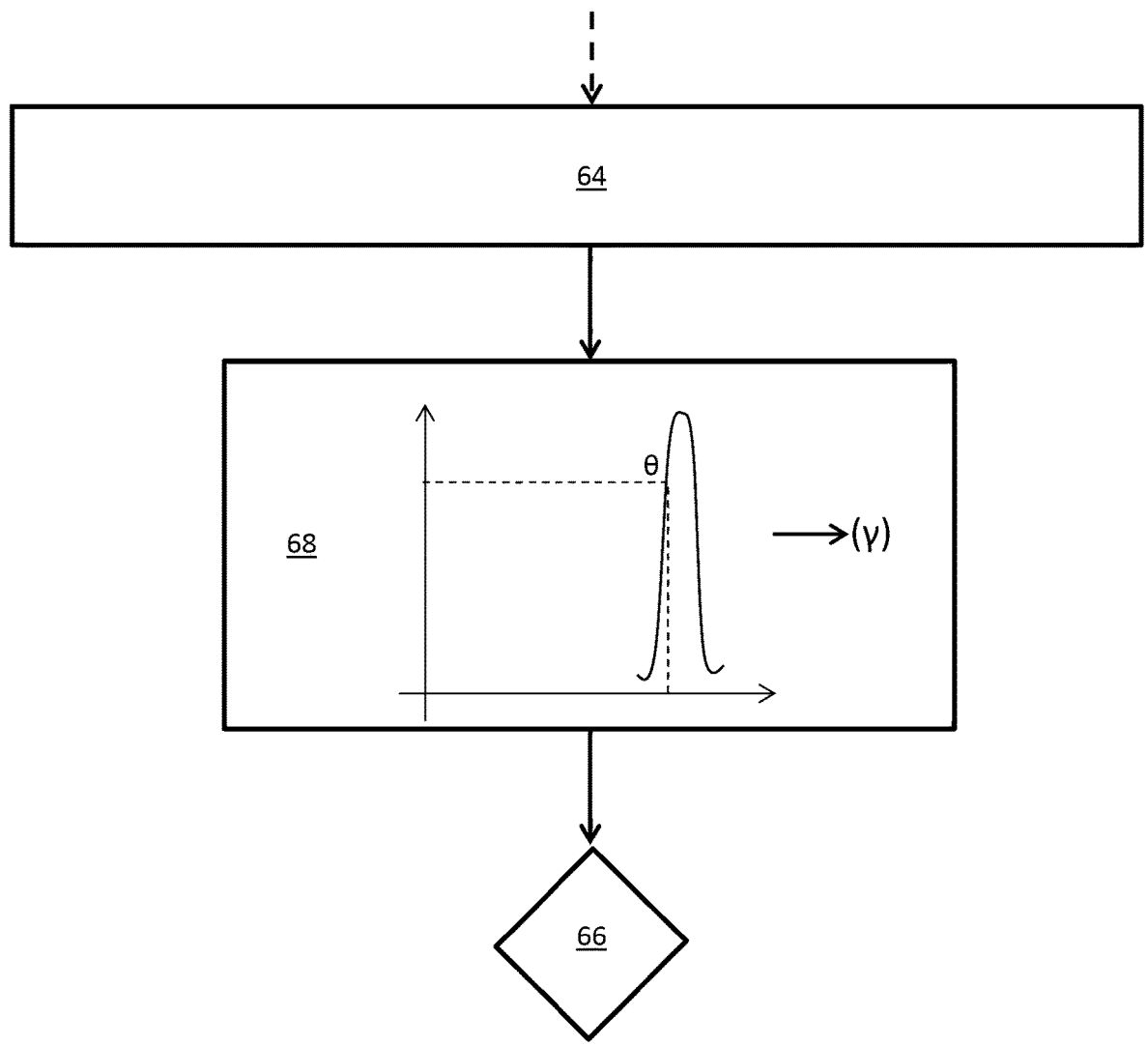
FIG. 5 is a flow chart illustrating an alternative aspect of operation of the system shown in FIG. 1.

FIG. 5 shows another embodiment of the process 50 shown in FIG. 3A or the process 51 shown in FIG. 3B, whereby common reference numerals indicate common features or steps. In this embodiment, prior to the decision stage 66, the processor 18, at 68, operates a second comparator to compare the composite value (θ) to composite reference data. The composite reference data comprises a range of composite values derived from previously operating the system 10. In this way, the composite reference data inherits the feature variance distribution data generated by the training process 30 executed for each technique 501, 502, 503, as the distribution data has already influenced determining previously derived composite values.

The comparison of a new composite value (θ) to composite reference data, at 68, allows the processor 18 to derive a confidence value (γ). This typically involves the composite reference data being expressed as a composite variance distribution, such as a graph defining a Gaussian curve. Similar to the comparator executed at the fourth stage 58 described above, the second comparator determines the confidence value (γ) from a relationship between the composite value (θ) and the composite variance distribution. This then allows the processor 18 to base the decision, at 66, on a quantum of the confidence value (γ). For example, where the composite variance distribution is expressed as a Gaussian curve, this may involve processor 18 assessing a proximity of the composite value (θ) to a peak of the curve. Often, where composite values (θ) are derived from multiplication of a plurality of likelihood values (β), the composite variance distribution 68 is narrow and defines a steep Gaussian curve, meaning that the derived confidence value (γ) is either very high or very low, thereby enabling the processor 18 to identify, with a high degree of confidence, whether the object 14 is the defined object. As described above, this allows a virtual binary decision to be made.

Figure 6A:
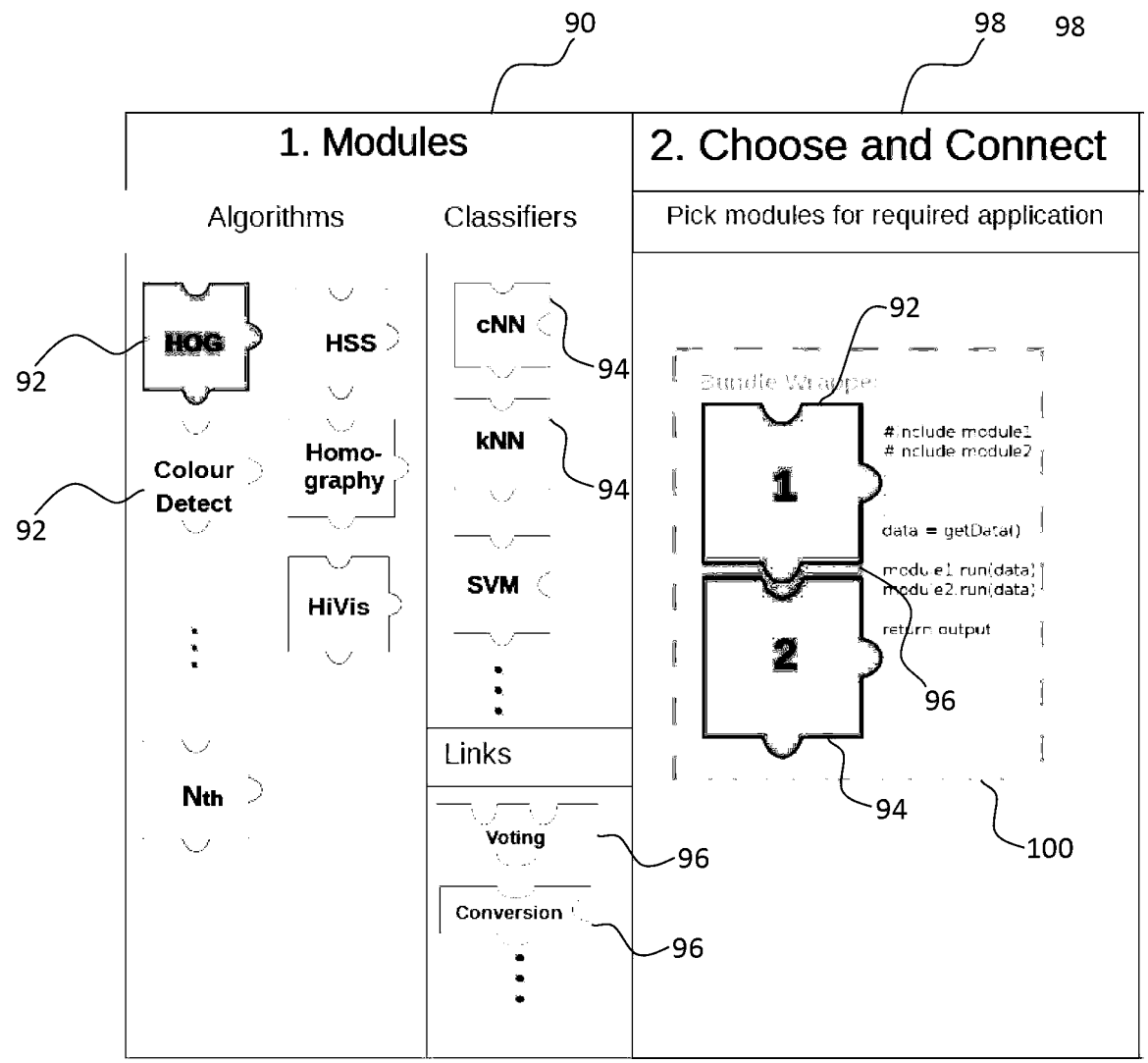
FIGS. 6A and 6B are diagrams illustrating components of the system shown in FIG. 1.

FIG. 6A illustrates stages of initially configuring the system 10, prior to any training or operation of the system 10. This configuration is typically determined according to the intended purpose of the system 10, whereby various object identification techniques, shown in FIG. 5A as modules 92, 94, are selected for execution by the processor 18, typically according to the target defined object the system 10 is being configured to identify. A first section 90 shows example technique modules 92, 94, such as algorithm modules 92 and classifier modules 94, and also shows link modules 96. The link modules 96 are configured to enable the combination stage, such as stage 64 described above, to derive the composite value (θ) from the plurality of likelihood values (β). Typically, a link module 96 is selected for execution by the system 10 responsive to the output of the selected object identification techniques 92, 94. A second section 98 shows three modules 92, 94, 96 operatively connected together to form a bundle 100. The bundle 100 may comprise all modules necessary for the system 10 to operate, or may be connected to other bundles if required.

Typically, the system 10 is configured to comprise complementary object identification technique modules to enhance the effectiveness of the processor 18 identifying the defined object. For example, a first technique may be known to function very reliably in well-lit conditions but occasionally not function well, or at all, in low lighting conditions, whereas a second technique is known to function fairly reliably in any lighting conditions. Incorporating and executing the first and second techniques in the system 10 means that the combined outputs of the techniques results in the system 10 functioning reliably in all lighting conditions and very reliably in well-lit conditions. The selection of techniques to be complementary is a result of at least one of manual and automated input. For example, typically a user would understand operational limitations of various techniques and select techniques which are appropriate to a real-world application of the system, for example, suitable for the operating environment and/or characteristics of the defined object. Alternatively or additionally, the system 10 may select techniques to be complementary, for example, groups of techniques may be pre-configured in a bundle due to providing statistically complementary outputs. Further alternatively, a user may select a first technique and an algorithm be configured to suggest potential complementary techniques for use with the first technique. Further alternatively, the processor 18 monitors manual configuration of the techniques and, after monitoring a number of 'learning cases', determines appropriate technique combinations for a target defined object without requiring user input.

The system 10 may be configured to execute two or more of a wide range of object identification technique modules. Examples of some appropriate modules are detailed in the following table:

| | | | |
|---|---|---|---|
| | | Modules | |
| ID | Name | Type | Description |
| A | Discontinuity Detection | Algorithm | Detection of contrasts and gradients in a surface using differentiation of pixel intensities. |
| B | Blob Detection | Algorithm | Detection of connected surface groups based on pixel value thresholding |
| C | Colour Detect | Algorithm | Simple thresholding of an image based on pixel values in a colour space |
| D | Motion Detection | Algorithm | Foreground and Background segmentation and frame comparison |
| E | HOG | Algorithm | Histogram of Orientated Gradients general object detection method |
| F | HSS | Algorithm | Head Should Shape person detection in a binary image |
| G | 3D shape fitting | Algorithm | Comparison of image to 3D object model |
| H | 2D Shape fitting | Algorithm | Comparison of image to pool of 2D shapes |

-continued

| | | Modules | |
|---|---|---|---|
| ID | Name | Type | Description |
| I | Homography | Algorithm | Transformation of detected object into the camera or world frame |
| J | Face Detection | Algorithm | Detection of human faces using Haar-like features |
| K | SVM | Classifier | Support Vector Machine. A supervised machine learning classifier |
| L | DL-NN | Classifier | Deep Learning Neural Networks for object classification |
| M | kNN | Classifier | k Nearest Neighbour. A simple classification technique |
| N | Voting | Link | Bayesian Probability to deal with multiple detection methods |
| O | Tracking and Filters | Link | Tracking modules in Nearest Neighbour, Particle Filters, Kalman Filter etc. |
| P | Data conversion | Link | Generic module for data type conversion when required |

It will be appreciated that the above table is not an exhaustive list of modules and the processor 18 may be configured to execute many other modules not detailed in the table. For example, the processor 18 is configurable to execute a "Deep Learning" module.

Figure 6B:
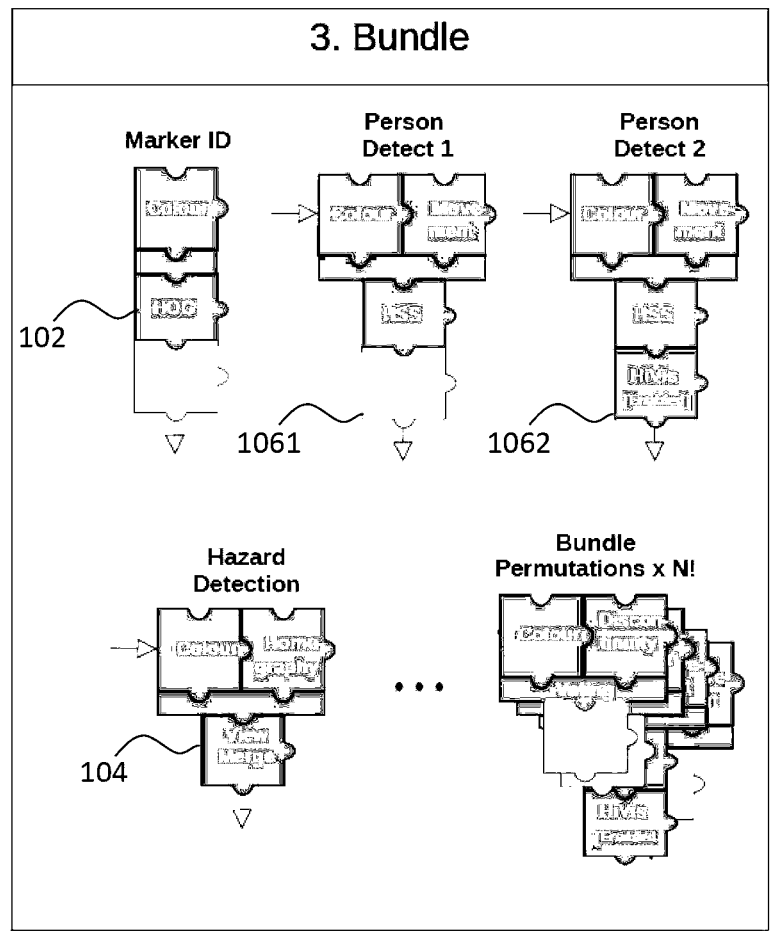

FIG. 6B shows examples of different bundle permutations configured for different purposes. For example, a first bundle 102 is configured to identify a specific marker, such as a red cross, as the defined object. A second bundle 104 is configured to identify a person within an exclusion zone as the defined object. A third bundle is shown having two configurations. A first configuration 1061 is configured to identify any person wearing personal protective equipment (PPE), for example, a hard hat and high visibility jacket/tabard, as the defined object. A second configuration 1062 is configured to identify any person, regardless of the presence of PPE, as the defined object. This is because in the second configuration 1062 a module (labelled HiVis) which identifies PPE has been disabled.

The system may be configured to execute one or more of a wide range of bundles. Examples of some appropriate bundles, including reference to typical system 10 purpose (application) and incorporated modules (components), are detailed in the following table:

| | | Bundles | |
|---|---|---|---|
| ID | Name | Application | Components |
| 1 | HOG Person | Person Detection | E + K |
| 2 | Moving People | Person Detection | D + F |
| 3 | HiVis Detect | Object Detection | C + O |
| 4 | HiVis Person HOG | Person Detection | 1 + 3 |
| 5 | HiVis Moving Persons | Person Detection | 2 + 3 |
| 6 | Perspective Change | View Changer | I + H |
| 7 | Camera Merge | View Changer | 6 + Multiple Inputs |
| 8 | Hazard Detect | Object Detection | C + I |
| 9 | Simple Object Mating | Object Tracking | C + H + B + I |
| 10 | Adv. Object Mating | Object Tracking | G + C + I |
| 11 | Simple Exclusion Zones | Object Tracking | C + H + B + I |
| 12 | Adv. Exclusion Zones | Object Tracking | 10 |
| 13 | Person/Trade ID | Person Identification | L |
| 14 | Wax QA | Defect Detection | A + C + G |
| 15 | Brick QA | Defect Detection | 14 |
| 16 | Sign and Symbol Comprehension | Symbol Detection | C + E + K + O |

Figure 7:
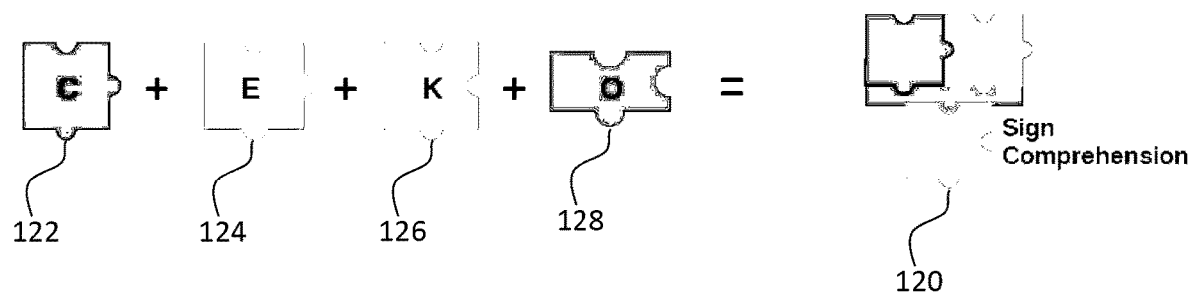
FIG. 7 is a diagram illustrating components of the system shown in FIG. 1 being connected together to configure the system.

FIG. 7 illustrates configuring the system 10 according to bundle ID 16 (120) detailed in the above table, whereby object identification technique modules C, E, K and 0 (122, 124, 126, 128) are communicatively coupled to identify predetermined signs and/or symbols.

Figure 8:
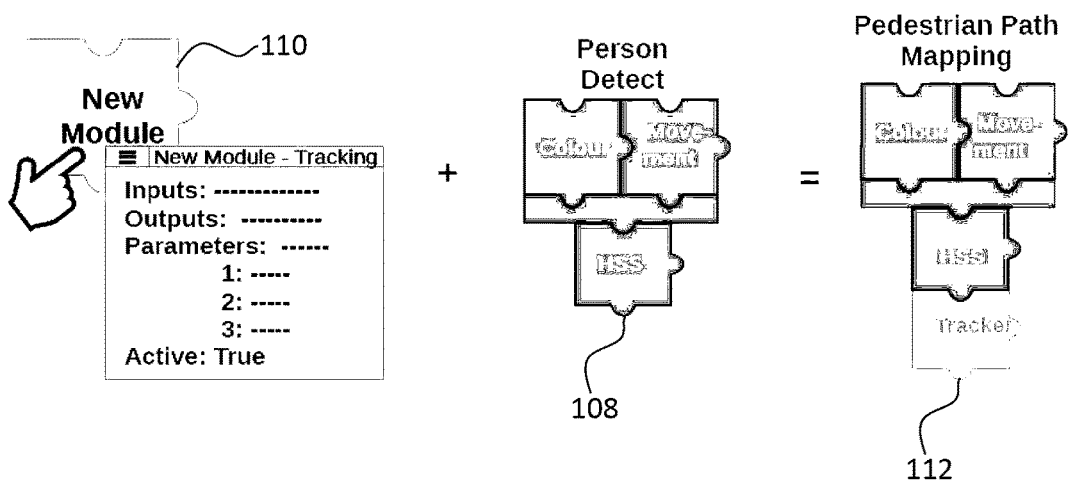
FIG. 8 is a diagram illustrating an additional component being added to the system to adapt the system for a different purpose.

FIG. 8 illustrates how a bundle 108 can be adapted to provide a different purpose, for example, to identify a different signature defined by an alternative defined object, by configuring and adding a further module 110, thereby forming an alternative bundle 112. For example, the bundle 108 may be configured to identify a signature defined by geometry of a human. This bundle 108 reconfigured as the alternative bundle 112 is then configured to identify a signature defined by a specific movement path defined by the human, such as a gait, by configuring the further module 110 as a motion tracker.

Figure 9:
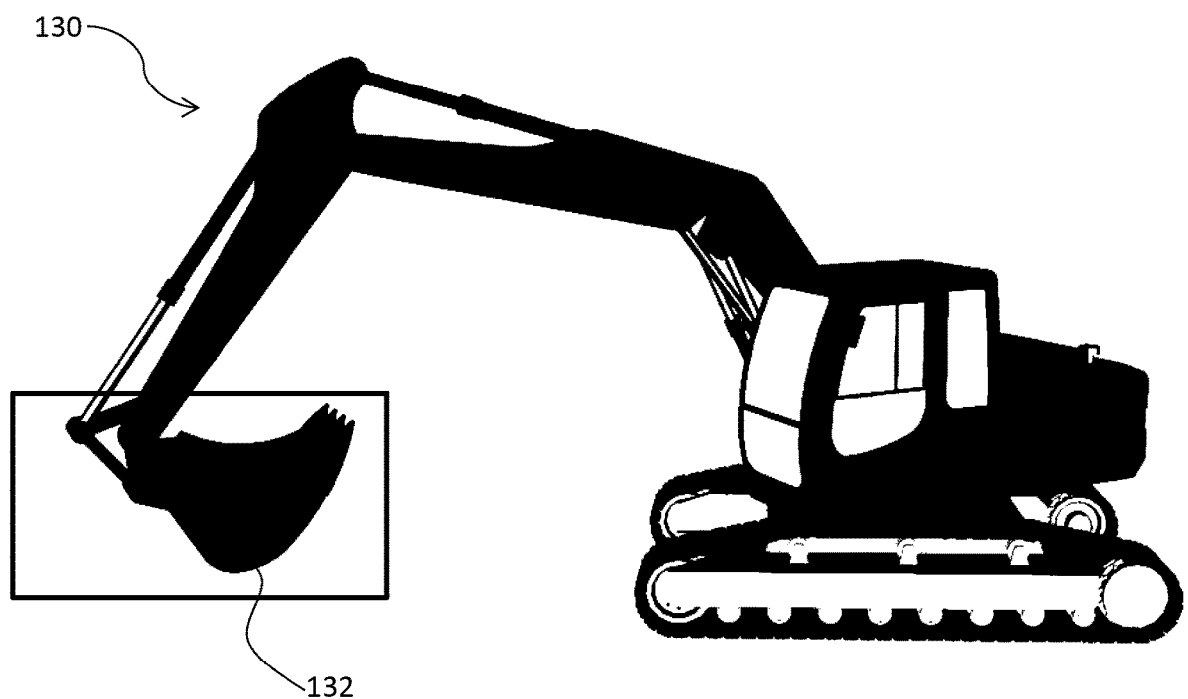
FIG. 9 is a diagram illustrating a geometry-based signature.

FIG. 9 shows an example of a signature defined by geometry of at least a portion of the defined object. Generally, a geometry signature comprises a specific shape, and/or relationship of one shape/point to another, which is able to be detected by the at least one sensor 12 of the system 10. In the embodiment shown in FIG. 9 the defined object is a bucket 132 of an excavator 130. For this embodiment, at least one of the object identification techniques executed by the processor 18 is trained, by the training data 32, to identify geometric features of buckets of excavators, and potentially also identify geometric features which are common to bucket variations, in order to determine the signature as being defined by specific geometry of the bucket 132. For example, this may involve the technique defining the signature as a vector defined by an outline of the bucket 132 or a dimension ratio, such as a height vs width ratio, defined by the bucket 132. In this way, the processor 18, executing the technique, can identify a detected bucket, when positioned within range of the at least one sensor 12, as being the defined object having the learnt signature.

Figure 10:
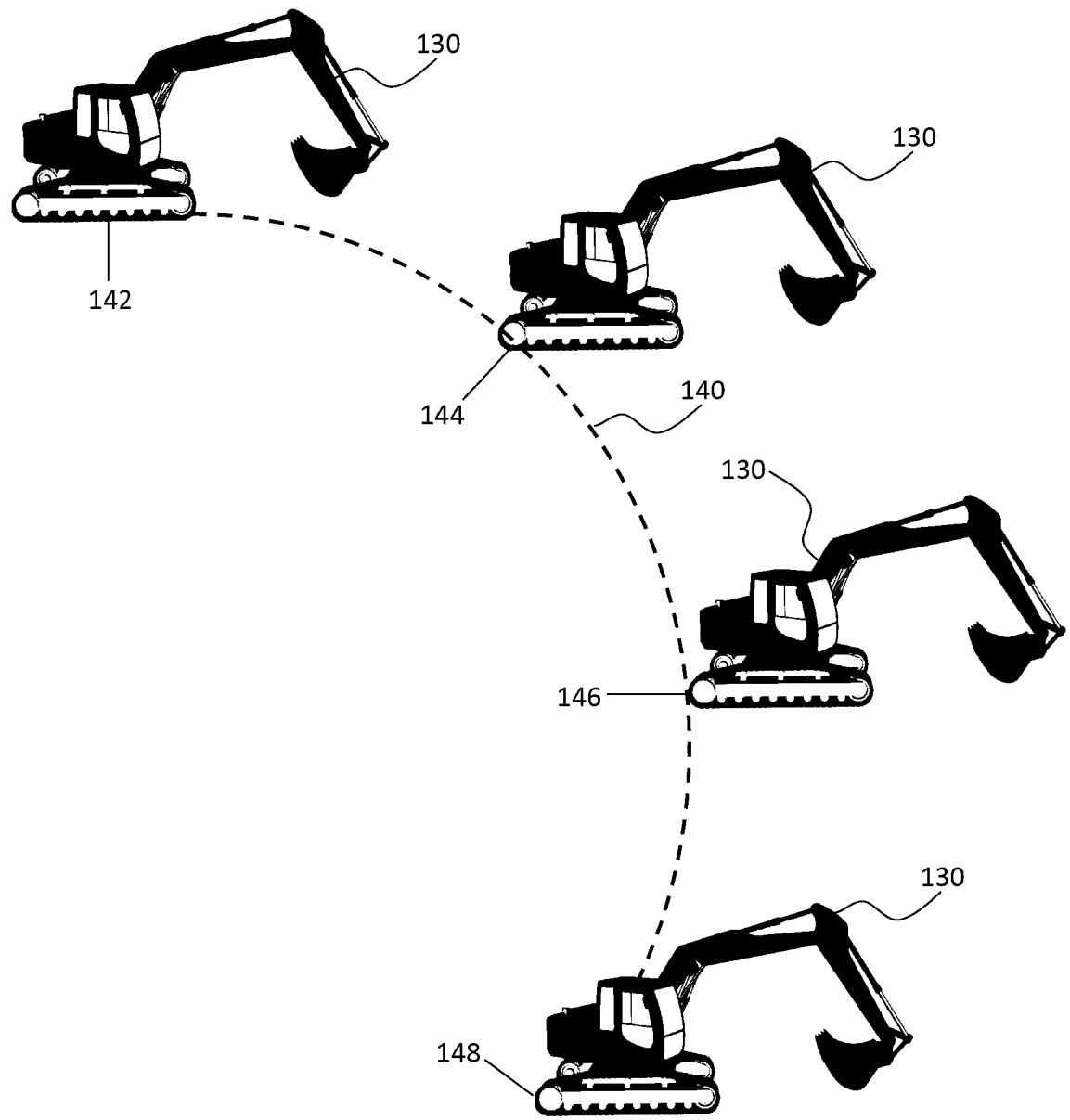
FIG. 10 is a diagram illustrating a movement-based signature.

FIG. 10 shows an example of a signature defined by motion of at least a portion of the defined object. Generally, a motion signature comprises a specific path defined by movement of the defined object, or a portion thereof, able to be detected by the at least one sensor 12 of the system 10. In the embodiment shown in FIG. 10 the defined object is an excavator 130 travelling along a curved path 140 within a defined time period (T). In this embodiment, at least one of the object identification techniques executed by the processor 18 is trained, by the training data 32, to identify, successively: an object of appropriate excavator 130 dimensions, or falling within other defined tolerances, at a first location 142 at a first time (T/4); an object of appropriate excavator 130 dimensions at a second location 144 at a second time (2×T/4); an object of appropriate excavator 130 dimensions at a third location 146 at a third time (3×T/4); and an object of appropriate excavator 130 dimensions at a further location 148 at a fourth time (3×T/4), in order to determine the signature as being defined by motion of the excavator 130 along the path 140 within the defined time period (T). In this way, the processor 18, executing the technique, can identify when an excavator has traversed the path 140 within the defined time period (T), and therefore identify the detected excavator as being the defined object having the learned signature.

Figure 11:
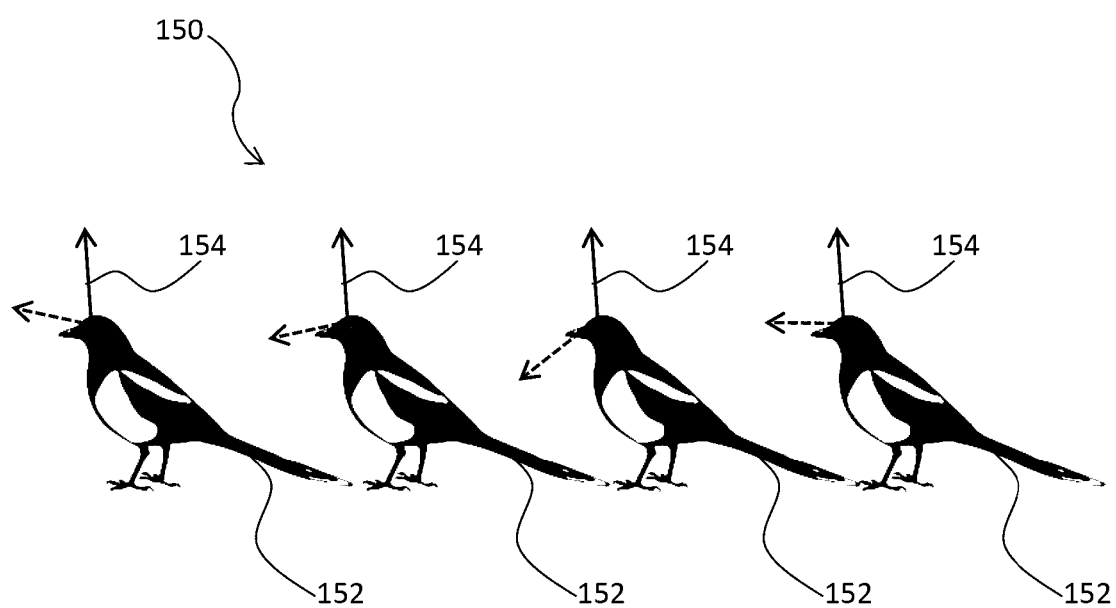
FIG. 11 is a diagram illustrating a behaviour-based signature.

FIG. 11 shows an example of a signature defined by a behaviour exhibited by at least a portion of the defined object. Generally, a behaviour signature comprises a plurality of specific motion paths defined by: movement of the defined object, such as a sequence of movements of a portion of the object; relative movement of different portions of the object; relative movement of a plurality of the objects, or the like. In the embodiment shown in FIG. 11 the defined object is a flock of birds 150, the flock comprising more than one of the same bird 152, exhibiting common movement, in this example being each bird 152 redirecting its gaze upwards 154 at the same time such as often occurs in response to a call of a predator. In this embodiment, at least one of the object identification techniques executed by the processor 18 is trained, by the training data 32, to identify a grouping of objects of appropriate bird 152 dimensions, or falling within other defined tolerances, and instances of each object (bird 152) orientating a corresponding portion (head of each bird 152) to a common position 154 simultaneously, in order to determine the signature as being defined by common motion of the flock of birds 150. In this way, the processor 18, executing the technique, can identify when a flock of birds 154 have exhibited the signature behaviour, and therefore identify the detected flock of birds as being the defined object having the learned signature.

Whilst the present disclosure makes reference to systems 10 and methods for identifying a defined object, it will be appreciated that these systems 10 and methods may be readily adapted to identify a defined hazard, and the term object and hazard are therefore interchangeable. where appropriate, in the context of this specification. A hazard will be appreciated to refer to a scenario associated with risk or danger, for example, risk of harm/damage to persons or equipment. In such embodiments, the system is configured to capture a digital representation of a scene instead of an object and therefore the term scene and object are also interchangeable, where appropriate, in the context of this specification.

For example, in embodiments of the system 10 configured to identify a hazard, the hazard may be defined as any equipment or vehicle arranged within a distance threshold of a person, as this could harm the person. In this embodiment, at least some of the techniques are configured as motion trackers and trained to identify various motion paths defined by various people, and various motion paths defined by various equipment and vehicles, and derive the signature from relative paths which result in equipment/vehicle being within the distance threshold. This means that when a scene containing people and equipment/vehicles is detected by the sensor 12 and assessed by the processor 18 by executing the techniques, the processor 18 is able to identify the hazard due to the relative motion paths, regardless of whether the object in close proximity to the person (or object moving like a person) is equipment or a vehicle, and regardless of the type of equipment or vehicle.

Similarly, in embodiments of the system 10 configured to identify a hazard, the hazard may be defined as any liquid arranged on a floor surface, as this could cause harm to a person slipping on the surface, or damage to equipment losing grip when moving across the surface. In this embodiment, at least some of the techniques are configured as geometry and data scanners, and trained to identify geometry and/or context data relating to indicators which indicate the hazard is imminent, such as geometry of hoses spraying liquid, or open containers of liquid, within a distance threshold of the surface, or weather data detailing a chance of rain local to the surface is greater than a defined threshold, and derive the signature from feature data derived from these indicators. This means that when a scene associated with conditions and/or containing objects which correspond with any of these indicators is detected by the sensor 12 and assessed by the processor 18 by executing the techniques, the processor 18 is able to identify the hazard due to the presence of one or more specific circumstances.

The disclosed systems 10 involve executing at least two different object identification techniques (and often many more than two), typically simultaneously or near simultaneously, to derive at least two respective likelihood values. These values are then combined, by the processor 18, to derive a composite likelihood value which influences the processor 18 determining whether the object 14 detected by the sensor 12 is the defined object. This approach is advantageous as each technique is configured differently and therefore functions with greater or lesser accuracy in certain operating conditions. By executing the two or more techniques and then combining the output likelihood values, inaccuracies of the different techniques are mitigated, thereby providing a reliable system able to operate in a wide range of operating conditions. This means that an object which corresponds with the defined object is more consistently correctly identified by the system 10 as being the defined object.

Each object identification technique executed by the processor 18 is typically configured to identify the defined object in a different way, as each technique is typically configured to identify a different signature defined by the same defined object. For example, a first technique may be configured to identify a geometric relationship defined by the defined object, whereas a second technique may be configured to identify one or more behaviour factors defined by the defined object. In this way, the techniques are configured to identify the same defined object responsive to assessing different characteristics of the defined object. This advantageously broadens the scope of operating conditions which the system 10 can accurately operate within, again enhancing the precision of the system. For example, in the scenario discussed above, where the entire object can be detected by the sensor, both techniques can successfully operate and therefore provide a high degree of accuracy. Alternatively, where part of the object is obscured, only the first technique may operate successfully, as the accuracy of the second technique may be impaired, allowing the system to still function but with reduced accuracy.

Typically, the at least two different object identification techniques are configured to be complementary to compensate for any known inaccuracies of each technique. The selection of the at least two techniques may be influenced by a range of factors and is typically influenced by at least one of characteristics of the defined object, configuration of the at least one sensor 12, and operating environment of the at least one sensor 12. The complementary relationship between techniques is configured manually, automatically, or a combination of these two approaches. This allows the system 10 to be strategically configured to enhance overall reliability and accuracy.

Each technique, executed by the processor 18, assesses the object 14 detected by the sensor 12 to derive a likelihood value indicating a likelihood of whether a signature candidate defined by the object 14, that is a characteristic of the object 14, corresponds with the signature which the technique has established is defined by the defined object. The likelihood value is derived by comparing the signature candidate to reference data which has been predetermined to include data relating to the signature. This process is useful as this allows the system 10 to compare new data (feature data derived from the signature candidate) to a potentially wide range of reference data which relates to the signature, to verify a probability of the signature being present in the new data and therefore derive a likelihood value. Combining multiple likelihood values derived in this way, to derive a composite likelihood value, further increases the confidence and consequently precision of the system 10.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A system for identifying a defined object, the system comprising:
   at least one sensor configured to detect data to define a digital representation of an object;
   a processor communicatively connected to the at least one sensor, the processor configured to execute at least two different techniques to assess the digital representation received from the at least one sensor, each technique configured to identify a signature defined by the defined object, the signature being specific to that technique; and
   a memory communicatively connected to the processor, the memory storing reference data relating to at least two different signatures derived, respectively, by the at least two different techniques;
   wherein the processor is configured so that, responsive to the processor receiving data defining the digital representation from the at least one sensor, the processor:
   executes the at least two different techniques, causing each technique to assess the same digital representation to:
      identify any signature candidate defined by the object represented in the digital representation;
      derive feature data from each identified signature candidate;
      compare the feature data to the reference data; and
      derive a likelihood value from each comparison, each likelihood value indicating a likelihood of the signature candidate corresponding with the respective signature derived by the technique;
   combine at least some of the likelihood values to derive a composite likelihood value; and
   determine from the composite likelihood value whether the object in the digital representation is the defined object.

2. The system according to claim 1, wherein the processor is further configured so that responsive to determining the object represented in the digital representation is the defined object, the processor adds the feature data, which the at least some of the likelihood values were derived from, to the reference data.

3. The system according to claim 2, further comprising a user interface, and wherein responsive to determining the object represented in the digital representation is the defined object, the processor is configured to operate the user interface to obtain user input to confirm the object is the defined object, and wherein responsive to the user input, the processor adds the feature data, which the at least some of the likelihood values were derived from, to the reference data.

4. The system according to claim 3, wherein the processor is further configured to operate the user interface to obtain user input to confirm one or more indicators which indicate the object represented in the digital representation is the defined object, and wherein responsive to the user input, the processor derives indicator data from the one or more confirmed indicators and adds the indicator data to the reference data.

5. The system according to claim 4, wherein the one or more indicators comprise context factors associated with the object in the digital representation.

6. The system according to claim 1, further comprising a user interface, and wherein responsive to determining the object represented in the digital representation is the defined object, the processor is configured to operate the user interface to obtain user input to define one or more actions to be executed by the system, and wherein responsive to the user input, the processor: derives instructions from the one or more defined actions; executes the instructions; and stores the instructions in the memory for execution responsive to subsequently determining the object in the digital representation is the defined object.

7. The system according to claim 1, further comprising an alert device configured to emit a discernible alarm, and wherein the processor is further configured so that responsive to determining the object represented in the digital representation is the defined object, the processor operates the alert device.

8. The system according to claim 7, wherein the alert device is configured as one of: a wearable device to be worn by a user; a haptic component of an apparatus; a controller for controlling operation of an apparatus such that operating the alert device effects control of the apparatus.

9. The system according to claim 1, further comprising a plurality of the sensors, each of the plurality of sensor being communicatively connected to each other and to the processor.

10. The system according to claim 9, wherein each sensor comprises a controller for controlling operation of the sensor, and wherein communication between the plurality of sensors causes operation of at least one of the controllers to effect control of the respective sensor.

11. The system according to claim 9, wherein the digital representation comprises data detected by more than one of the plurality of sensors.

12. The system according to claim 1, wherein at least one of the signatures is defined by at least one of: a property of the defined object; geometry defined by the defined object; behaviour of the defined object; and one or more context factors associated with the defined object.

13. The system according to claim 12, wherein the behaviour of the defined object comprises one or more of: movement of the defined object; inactivity of the defined object; relative movement of the defined object and another object; and a response of the defined object responsive to a stimuli.

14. The system according to claim 12, wherein the one or more context factors associated with the defined object include: time of day local to the defined object; environmental conditions local to the defined object; weather local to the defined object; a position of one or more objects relative to the defined object; behaviour of one or more objects local to the defined object; and operating parameters of the defined object.

15. The system according to claim 1, wherein, for each technique, the processor is trained to derive feature data from exposure to predetermined training data, and to store the feature data derived from the predetermined training data as the reference data.

16. The system according to claim 15, wherein the predetermined training data includes a plurality of digital representations, wherein only some of the plurality of digital representations include the defined object and are labelled to confirm presence of the defined object, and, for each technique, exposure to the predetermined training data causes the processor to learn one or more common elements defined in each labelled digital representation, and to derive the signature responsive to the one or more common elements.

17. The system according to claim 1, wherein the reference data defines a feature data variance distribution associated with each technique, and wherein the likelihood value is derived from comparing the feature data to the feature variance distribution.

18. The system according to claim 1, wherein deriving the composite likelihood value comprises combining at least one likelihood value derived by executing one of the techniques with at least one likelihood value derived by executing another of the techniques.

19. The system according to claim 1, wherein the memory stores composite reference data relating to predetermined composite likelihood values, and determining whether the object represented in the digital representation is the defined object further comprises comparing the composite likelihood value to the composite reference data to derive a confidence value, and determining whether the object represented in the digital representation is the defined object based on the confidence value.

20. A system for identifying a defined hazard, the system comprising:
  at least one sensor configured to detect data to define a digital representation of a scene;
  a processor communicatively connected to the at least one sensor, the processor configured to execute at least two different techniques to assess the digital representation received from the at least one sensor, each technique configured to identify a signature of the defined hazard, the signature being specific to that technique; and
  a memory communicatively connected to the processor, the memory storing reference data relating to at least two different signatures derived, respectively, by the at least two different techniques;
  wherein the processor is configured so that responsive to the processor receiving data from the at least one sensor defining the digital representation, the processor:
  executes the at least two different techniques, causing each technique to assess the digital representation to:
    identify any signature candidate defined by the scene represented in the digital signature;
    derive feature data from each identified signature candidate;
    compare the feature data to the reference data; and
    derive a likelihood value from each comparison, each likelihood value indicating a likelihood of the signature candidate corresponding with the respective signature;
  combine at least some of the likelihood values to derive a composite likelihood value; and
  determine from the composite likelihood value whether the scene represented in the digital representation includes the defined hazard.

* * * * *